US012810718B2

United States Patent
(12) United States Patent
Naik et al.

(10) Patent No.: US 12,810,718 B2
(45) Date of Patent: Nov. 24, 2026

(54) HYBRID REMOTE DEVICE FOR INTERFACING WITH A FIRE ALARM PANEL LOOP

(71) Applicant: Tyco Fire & Security GmbH, Schaffhausen (CH)

(72) Inventors: Nilesh Ashok Naik, Sawantawadi (IN); Abhishek Atul Mahajan, Schaffhausen (CH); Pooja Anand Kumbhar, Schaffhausen (CH); Ankit Dineshchandra Panchal, Mumbai (IN)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 18/608,353

(22) Filed: Mar. 18, 2024

(65) Prior Publication Data

US 2025/0292671 A1 Sep. 18, 2025

(51) Int. Cl.

| | |
|---|---|
| ***G08B 26/00*** | (2006.01) |
| ***G08B 17/00*** | (2006.01) |
| ***G08B 17/113*** | (2006.01) |
| ***G08B 25/04*** | (2006.01) |

(52) U.S. Cl.

CPC ........... *G08B 26/005* (2013.01); *G08B 17/00* (2013.01); *G08B 17/113* (2013.01); *G08B 25/04* (2013.01)

(58) Field of Classification Search

CPC .... G08B 26/005; G08B 17/00; G08B 17/113; G08B 25/04

USPC .......................................................... 439/638

See application file for complete search history.

(56) References Cited

U.S. PATENT DOCUMENTS

| | | | | |
|---|---|---|---|---|
| 3,734,342 | A * | 5/1973 | Patterson | H02G 3/081 220/327 |
| 3,959,788 | A | 5/1976 | Tipton et al. | |
| 4,568,919 | A * | 2/1986 | Muggli | G08B 26/005 340/505 |
| 4,823,118 | A | 4/1989 | Suzuki et al. | |
| 4,988,977 | A | 1/1991 | Payne et al. | |
| 5,268,850 | A * | 12/1993 | Skoglund | H02J 9/08 307/64 |
| 5,357,243 | A | 10/1994 | Tice | |
| 5,450,072 | A | 9/1995 | Vockenhuber | |

(Continued)

FOREIGN PATENT DOCUMENTS

| | | |
|---|---|---|
| CN | 109100999 A | 12/2018 |
| CN | 115512508 A | 12/2022 |

(Continued)

OTHER PUBLICATIONS

"ZXe Intelligent multi Protocol fire alarm control panel", Morleyias Fire Systems, Available online at <http://www.intertrade.ps/userfiles/file/zxs2ss.pdf>, XP055398394, Nov. 27, 2002, pp. 1-6.

(Continued)

*Primary Examiner* — John A Tweel, Jr.

(74) *Attorney, Agent, or Firm* — ArentFox Schiff LLP

(57) ABSTRACT

A method and apparatus relating to providing a remote device for a fire alarm control system are, in turn, provided. The aspects include configuring each at least two replaceable sub-devices to provide at least one of a notification and a detection of a fire event. The aspects include configuring a housing to receive and connect to the at least two replaceable sub-devices.

32 Claims, 32 Drawing Sheets

(56) References Cited

U.S. PATENT DOCUMENTS

| | | | |
|---|---|---|---|
| 5,661,719 A | 8/1997 | Townsend et al. | |
| 5,818,334 A | 10/1998 | Stanley | |
| 6,016,211 A | 1/2000 | Szymanski et al. | |
| 6,351,219 B1 | 2/2002 | Tanguay et al. | |
| 6,380,854 B1 | 4/2002 | Hagerman et al. | |
| 6,524,240 B1 | 2/2003 | Thede | |
| 7,467,881 B2 * | 12/2008 | McMillen | F21V 33/0076 362/147 |
| 7,649,450 B2 | 1/2010 | Campion, Jr. et al. | |
| 8,193,665 B2 * | 6/2012 | Eiden | H05B 41/30 307/157 |
| 9,257,032 B2 | 2/2016 | Brenner | |
| 10,069,293 B2 * | 9/2018 | Meah | G08B 29/043 |
| 10,140,839 B1 | 11/2018 | Smith et al. | |
| 11,232,703 B1 | 1/2022 | Wolf et al. | |
| 11,410,534 B2 | 8/2022 | Arellano Valderrama | |
| 11,816,974 B1 | 11/2023 | Lontka et al. | |
| 11,847,901 B2 | 12/2023 | Solis Vidal | |
| 11,900,788 B1 | 2/2024 | Zwirn | |
| 11,978,333 B2 * | 5/2024 | Escofet | G08B 25/003 |
| 12,170,009 B2 | 12/2024 | Escofet Via et al. | |
| 2001/0039486 A1 | 11/2001 | Horie et al. | |
| 2002/0024435 A1 | 2/2002 | Suzuki et al. | |
| 2004/0112114 A1 | 6/2004 | Penney et al. | |
| 2004/0213217 A1 | 10/2004 | Willhite et al. | |
| 2005/0057353 A1 | 3/2005 | Barrieau et al. | |
| 2008/0084291 A1 | 4/2008 | Campion et al. | |
| 2008/0316048 A1 | 12/2008 | Abdallah | |
| 2010/0315224 A1 | 12/2010 | Orsini et al. | |
| 2011/0289247 A1 | 11/2011 | Burklund | |
| 2013/0285808 A1 | 10/2013 | Piccolo, III | |
| 2014/0210667 A1 | 7/2014 | Wang et al. | |
| 2014/0210668 A1 | 7/2014 | Wang et al. | |
| 2014/0266676 A1 | 9/2014 | Piccolo, III et al. | |
| 2014/0278144 A1 | 9/2014 | Risk et al. | |
| 2014/0278186 A1 | 9/2014 | Herzl et al. | |
| 2016/0035201 A1 | 2/2016 | Savage et al. | |
| 2016/0268683 A1 | 9/2016 | Wang et al. | |
| 2016/0359230 A1 | 12/2016 | Wang et al. | |
| 2017/0069197 A1 | 3/2017 | Pettigrew et al. | |
| 2017/0213429 A1 | 7/2017 | Marien et al. | |
| 2017/0294092 A1 | 10/2017 | Farley et al. | |
| 2018/0191720 A1 | 7/2018 | Dawes | |
| 2018/0204429 A1 | 7/2018 | Savage, Jr. et al. | |
| 2018/0359220 A1 | 12/2018 | Trivelpiece et al. | |
| 2020/0019287 A1 | 1/2020 | Sahai et al. | |
| 2020/0027055 A1 | 1/2020 | Delaney et al. | |
| 2021/0006622 A1 | 1/2021 | Knight et al. | |
| 2021/0062549 A1 | 3/2021 | Shelke et al. | |
| 2022/0003399 A1 | 1/2022 | Kohen | |
| 2022/0020263 A1 | 1/2022 | Farley et al. | |
| 2022/0068115 A1 | 3/2022 | Iasso et al. | |
| 2022/0108594 A1 | 4/2022 | Farley et al. | |
| 2022/0398910 A1 | 12/2022 | Stowell | |
| 2023/0036108 A1 | 2/2023 | Crouch et al. | |
| 2023/0108030 A1 | 4/2023 | Escofet et al. | |
| 2024/0087443 A1 | 3/2024 | Escofet Via et al. | |
| 2024/0412618 A1 | 12/2024 | Farley et al. | |
| 2025/0068133 A1 | 2/2025 | Hegde et al. | |

FOREIGN PATENT DOCUMENTS

| | | |
|---|---|---|
| EP | 2860715 A1 | 4/2015 |
| EP | 3706090 A1 | 9/2020 |
| WO | 2018/174540 A1 | 9/2018 |

OTHER PUBLICATIONS

International Search Report and Written Opinion received for PCT Patent Application No. PCT/US2025/014375, mailed on May 2, 2025, 15 pages.

Invitation to Pay Additional Fees received for PCT Patent Application No. PCT/US2025/020252, mailed on Jul. 3, 2025, 15 pages.

Invitation to Pay Additional Fees received for PCT Patent Application No. PCT/US2025/020282, mailed on Jul. 28, 2025, 8 pages.

* cited by examiner

HYBRID REMOTE DEVICE FOR INTERFACING WITH A FIRE ALARM PANEL LOOP

Aspects of the present disclosure relate generally to fire alarm systems and, more particularly, to a hybrid remote device for interfacing with a fire alarm panel loop.

BACKGROUND

Traditional fire alarm control panels (FACPs) are designed to interface with various types of device loops. Various manufacturers have their own proprietary device protocols and corresponding hardware for interfacing with FACPs. Accordingly, remote devices such as aspirating smoke detectors, beam detectors and so forth are often desired to be integrated with a FACP, but such integration is complex and requires significant time and effort and needs to be done every time a new remote device is integrated with the FACP. Accordingly, there is a need for a way to readily integrate remote devices such as fire detection devices and fire notification devices to FACPs.

Conventional remote devices such as fire detection devices and fire notification devices have non-addressable printed circuit boards (PCBs). As such, there is a need for a way to address and/or otherwise reconfigure a non-addressable PCB of a remote device to be associated with an address.

Conventional remote devices are limited to a singular function directed to only one of fire detection or fire notification. Accordingly, multiple devices are often employed proximate to each other in order to provide multiple functions in a small area. There is a need to reduce the number of devices that are needed at given locations and/or provide more than a singular function by similar devices.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In an aspect, a remote device for a fire alarm control system is provided. The remote device includes at least two replaceable sub-devices. Each of the at least two replaceable sub-devices is configured to provide at least one of a notification and a detection of a fire event. The remote device further includes a housing configured to receive and connect to the at least two replaceable sub-devices.

In another aspect, a method for providing a remote device for a fire alarm control system is, in turn, provided. The method includes configuring each at least two replaceable sub-devices to provide at least one of a notification and a detection of a fire event. The method further includes configuring a housing to receive and connect to the at least two replaceable sub-devices.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
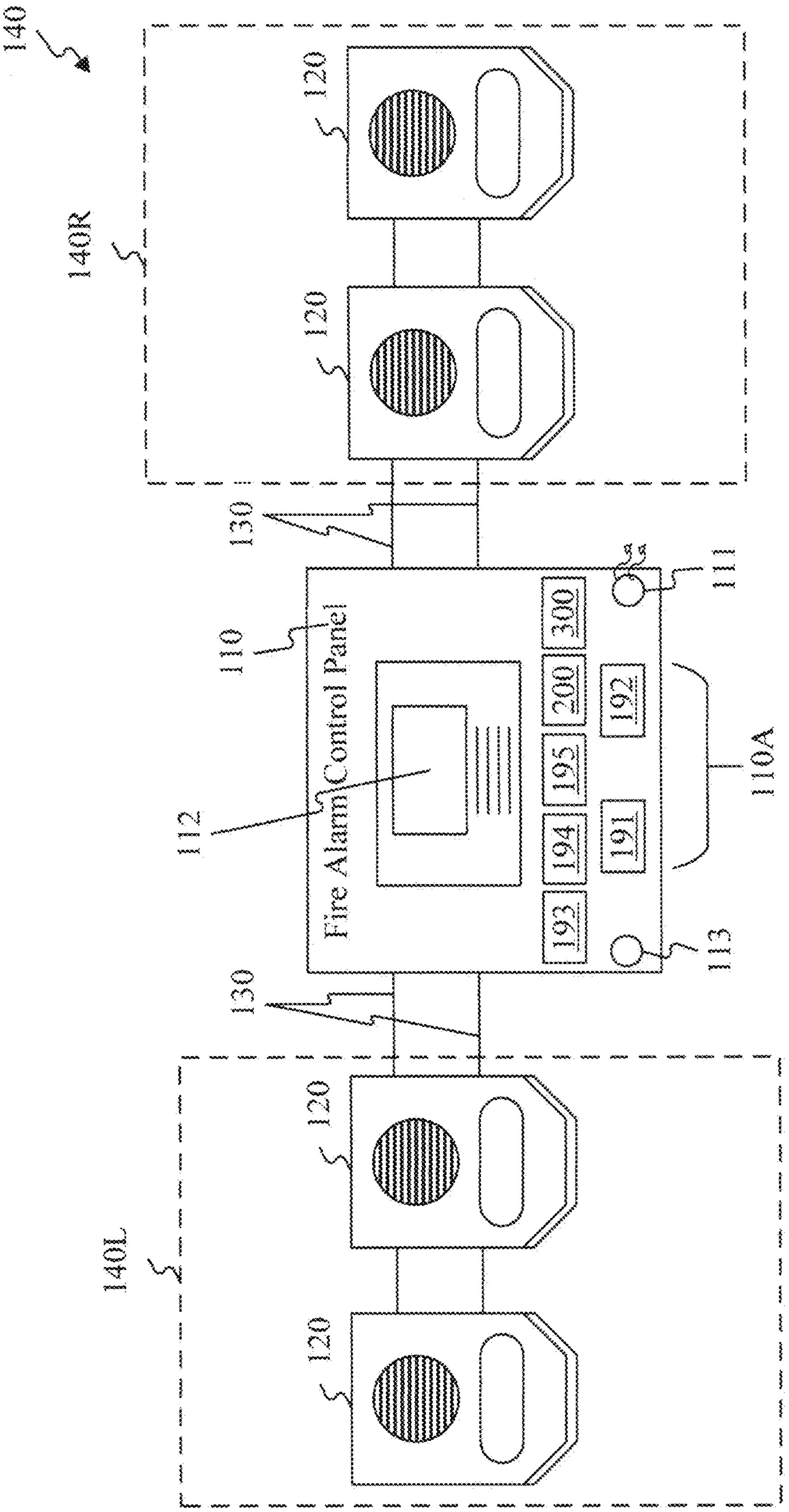
FIG. 1 is a block diagram of an example fire notification system, in accordance with an exemplary aspect.

Initially, aspects of the disclosure are directed to a remote device integrator for a fire alarm control panel (FACP) loop. In one or more aspects, multiple different device protocols may be processed by a single generic interface (IF). This allows integration of the different device protocols in a single remote device.

As used herein, the term "remote device" refers to a fire alarm system device that is remote from (that is, not within) the FACP, and may be, but is not limited to, a speaker, a strobe, a smoke alarm, and so forth.

In some aspects, a remote device may include a modular hybrid remote device. A "modular hybrid remote device" is a remote device capable of deploying two or more sub-devices at the same time, but may only include one device at any given time with cover plates for other slots for other sub-devices that are not currently filled.

Additionally, aspects of the disclosure are further are directed to a modular remote device. In one or more aspects, multiple sub-devices may be integrated into a single modular remote device. For example, in an aspect, multiple sub-devices such as any two or more of, for example, but not limited to, a speaker, a strobe, and a smoke detector, may be integrated into a single remote device.

Furthermore, aspects of the disclosure are also directed to an addressable printed circuit board (PCB) for interfacing with a conventional PCB at least to transfer the address set in the addressable PCB to the conventional PCB. This allows address and/or other information such as product upgrades to be installed on a remote device having a non-addressable PCB.

As used herein, the terms "conventional PCB or "non-addressable PCB" refers to a PCB not having an addressing capability. That is, without assistance as described herein using an addressable PCB, the non-addressable PCB cannot be addressed. In contrast, an addressable PCB is one with a capability of being addressed. For example, light emitting diodes (LEDs), dip or other switches, and so forth may be used to set an address on an addressable PCB. As is evident, such address is changeable as needed by the user in the case of unwanted repetitive address use.

Referring to aspects of the disclosure relating to the remote device integrator, the following description is further provided.

In an aspect, a generic IF is provided able to integrate with multiple different device protocols.

In an aspect, a generic IF is provided as a shared hardware Input/Output (I/O) IF configured to integrate different devices having different device protocols. In an aspect, the shared hardware I/O IF enables the interfacing of different device protocols with the FACP.

As used herein, the term "device protocol" refers to both a power protocol portion and a data protocol portion. The power protocol portion includes a particular power connection protocol. The data protocol portion includes a particular data protocol. The power connection protocol and data protocol will vary between different device protocols pertaining to different device types (e.g., notification versus detecting devices from among remote devices connected to a FACP).

In an aspect, a particular connector arrangement is used which has contacts (e.g., pins, compression springs, etc.) that may (e.g., power) or may not (e.g., data) overlap in function from device protocol to device protocol. In this way, a shared connector arrangement can be exploited from device protocol to device protocol.

In an aspect, an enhanced serial IF is provided for remote devices which allows more efficient data exchange with FACPs.

In an aspect, an enhanced wireless IF is provided for remote devices which allows more efficient data exchange with FACPs.

In an aspect, the enhanced serial IF and corresponding serial IF device protocol (as well as the wireless IF and corresponding wireless IF protocol) are made generic in that they apply to more than one different type of device protocol. In an aspect, the device protocols can include both MX and IDNet based systems by Johnsons Controls®. However, it is to be appreciated that the present disclosure is not limited to the preceding device protocols and may be used with any existing and to be developed device protocols.

In an aspect, shared hardware I/O IF also includes a hardware I/O IF that allows for conventional connections to existing device protocols to enable backward compatibility with non-compliant (non-serial IF or wireless IF using) devices. To that end, different types of connectors compliant with different device protocols may be included the hardware I/O IF.

In an aspect, for the sake of illustration, a first device protocol and a second device protocol will be referred to. In an aspect, the first device protocol or the second device protocol can be MX and the other can be IDNet. However, it is to be appreciated that aspects of the present disclosure can switch between two or more different device protocols including protocols other than MX and IDNet.

In an aspect, for the sake of illustration, connections will be made between a first device protocol loop and a second device protocol loop for respectively implementing the first device protocol and the second device protocol.

Referring to aspects of the disclosure relating to the modular hybrid remote device, the following description is further provided.

In an aspect, a single remote device, interchangeable referred to as modular hybrid remote device, may include two or more sub-devices. The sub-devices are modular in that the sub-devices are capable of being swapped in and out and replaced as needed. For example, the sub-devices may be allocated according to a fire specification and/or fire plan for a fire alarm control system. The sub-devices may be changed at a later date in accordance with specification and/or plan changes. In this way, sub-device flexibility affords both single device and system flexibility in functions that can be handled by various devices. Cover plates and/or other devices may be used to respectively cover or fill a sub-device slot in the single remote device. In this way, space may be utilized or otherwise shielded from the elements, tampering, and so forth.

In an aspect, the single remote device may include or interface with an interface plate that is configured to attach to a junction box for power and signal (control). In this way, a space efficient solution is provided regarding mounting a remote device.

In an aspect, the interface plate may include electrical connectors for the multiple sub-devices. In various aspects, the connectors allow for connection to the sub-devices irrespective of whether they are the same or different in type and/or function. In an aspect, different banks of connectors are used for different devices, with clear labels next to the banks to indicate the corresponding device to connect (e.g., speaker, strobe, smoke detector, etc.) to prevent wiring mistakes and ensure proper operation when the sub-devices are being installed into the remote device.

Referring to aspects of the disclosure relating to the addressable PCB, the following description is further provided.

In an aspect of the disclosure, an addressable PCB is attached to a remote device having a non-addressable PCB in order to provide the address set on the addressable PCB to the non-addressable PCB.

In an aspect, the addressable PCB is mounted on a receiving slot in an interface plate configured to interface a junction box with a remote device. In this way, flexibility can be achieved by changing the addressable PCB to incorporate new or upgraded functionality.

In an aspect, the addressable PCB is mounted in an expansion module in between a cover plate of a junction box and a remote device. In this way, a different expansion module can be used when the capabilities of the addressable PCB are exceeded over time or when an upgrade to the addressable PCB is needed that cannot be done through software (e.g., a software flash).

In an aspect, the addressable PCB is mounted in a receiving slot in the remote device that is configured to interface the addressable PCB with the non-addressable OCB of the remote device. In this way, a space efficient remote device with upgradeable capabilities is provided without the need for any extra devices such as an interface plate and/or expansion module.

FIG. 1 shows aspects of an example fire notification system to which aspects of the disclosure may be applied.

Figure 2:
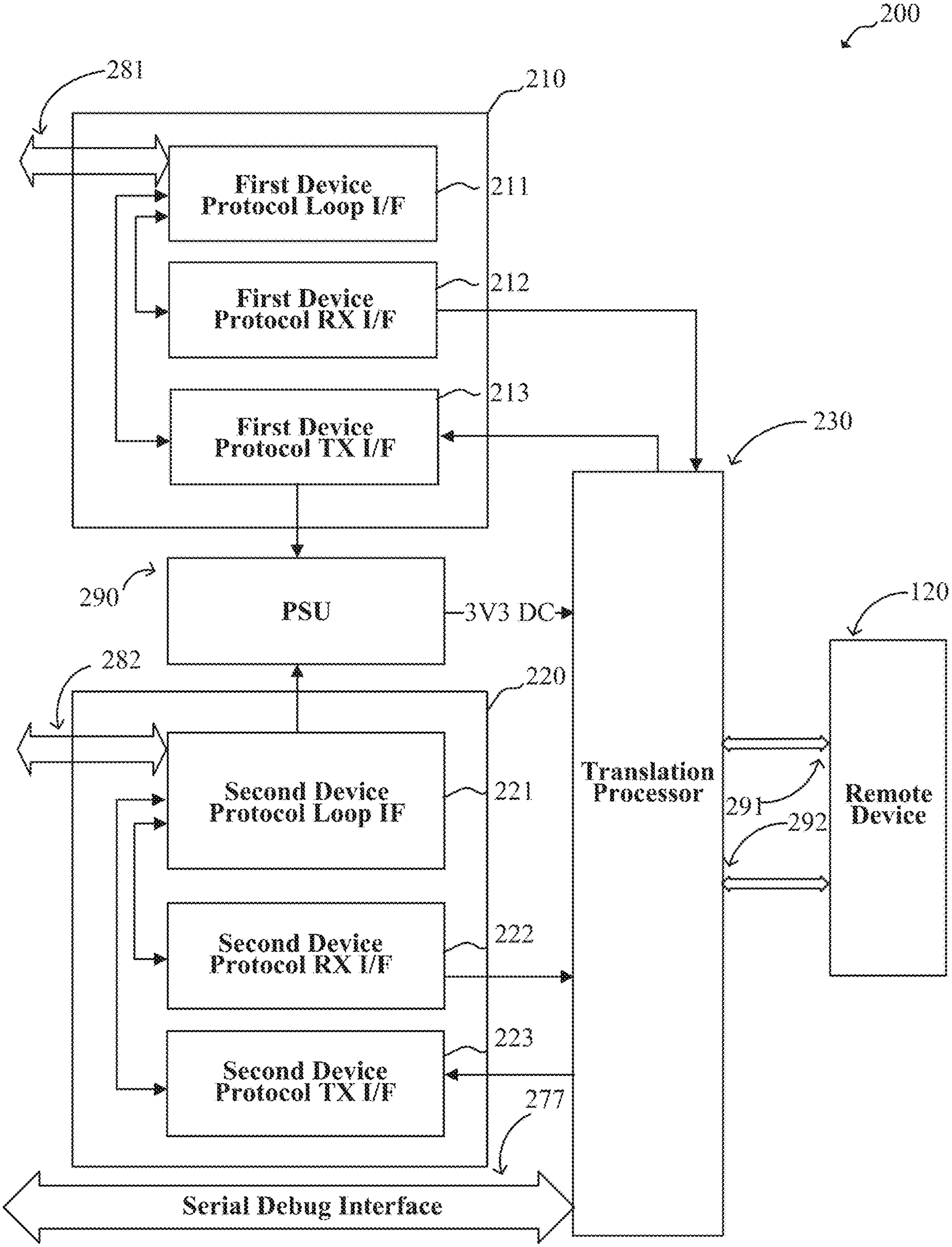
FIG. 2 is a block diagram of an example serial hardware Input/Output (I/O) interface (IF) supporting two different device protocols, in accordance with an exemplary aspect.
Figure 3:
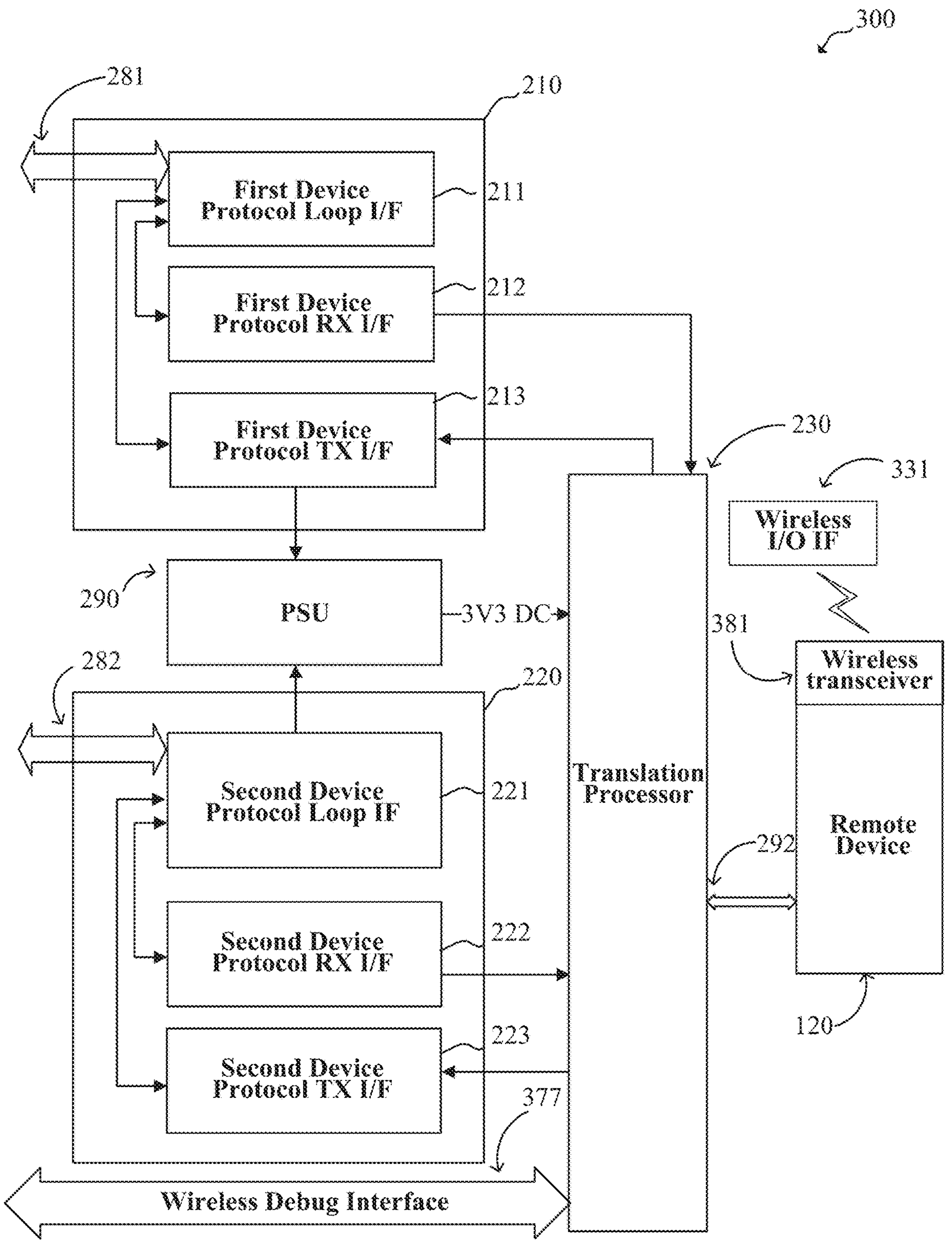
FIG. 3 is a block diagram of an example wireless hardware I/O IF supporting two different device protocols, in accordance with an exemplary aspect.
Figure 16:
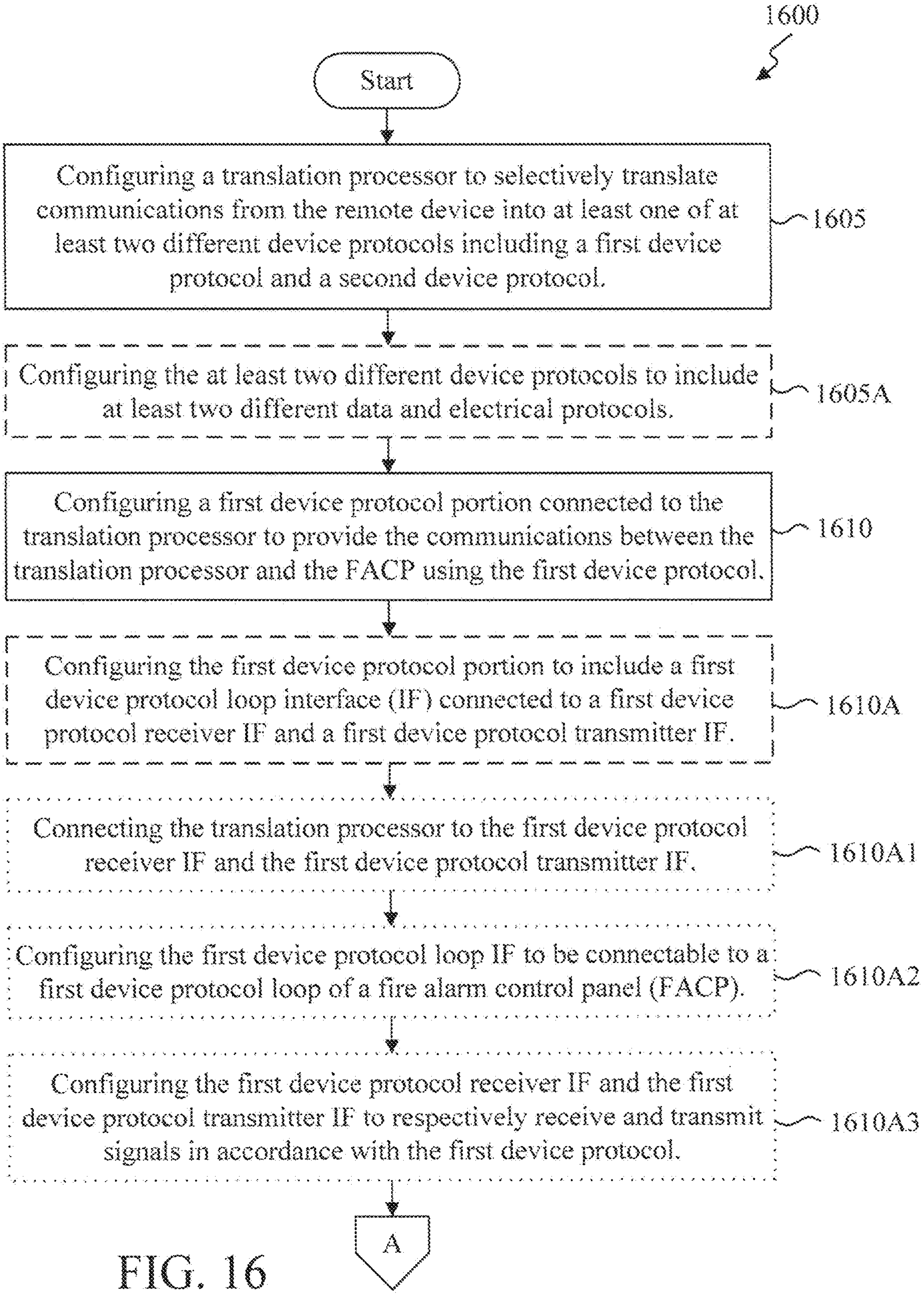
FIGS. 16-18 is a flow diagram of an example method for coupling a remote device to a fire alarm control panel (FACP), in accordance with an exemplary aspect
Figure 17:
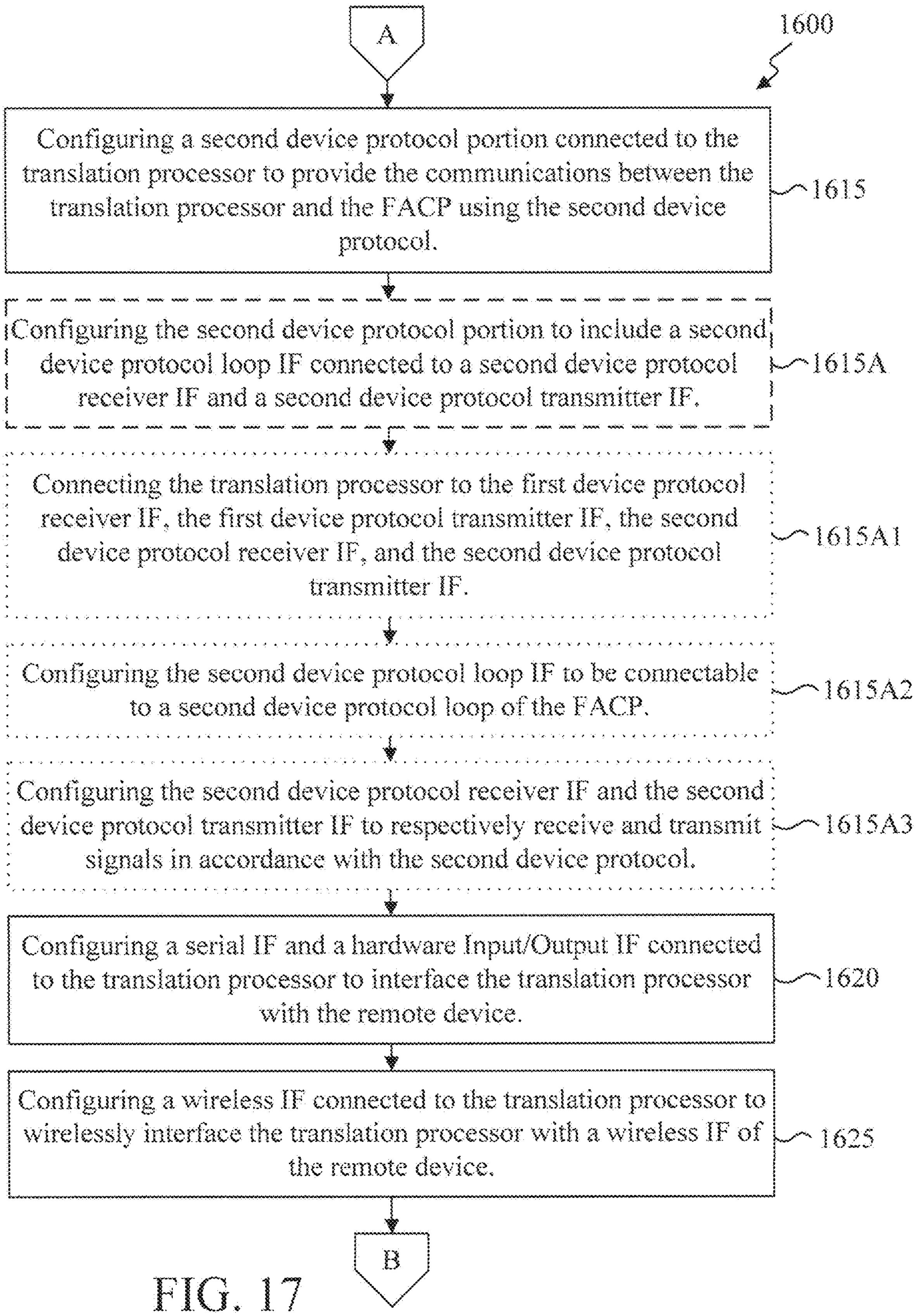
Figure 18:
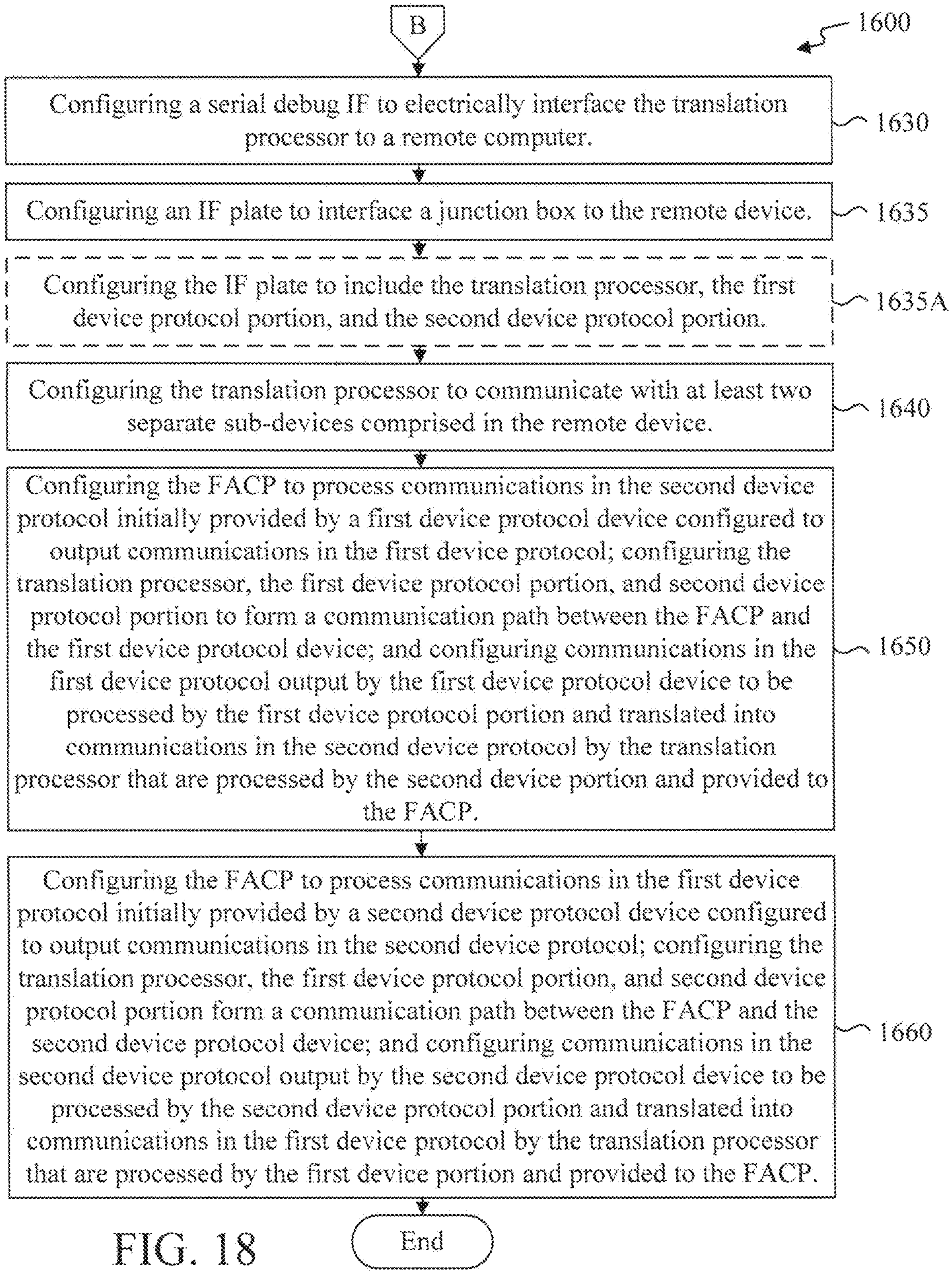
Figure 19:
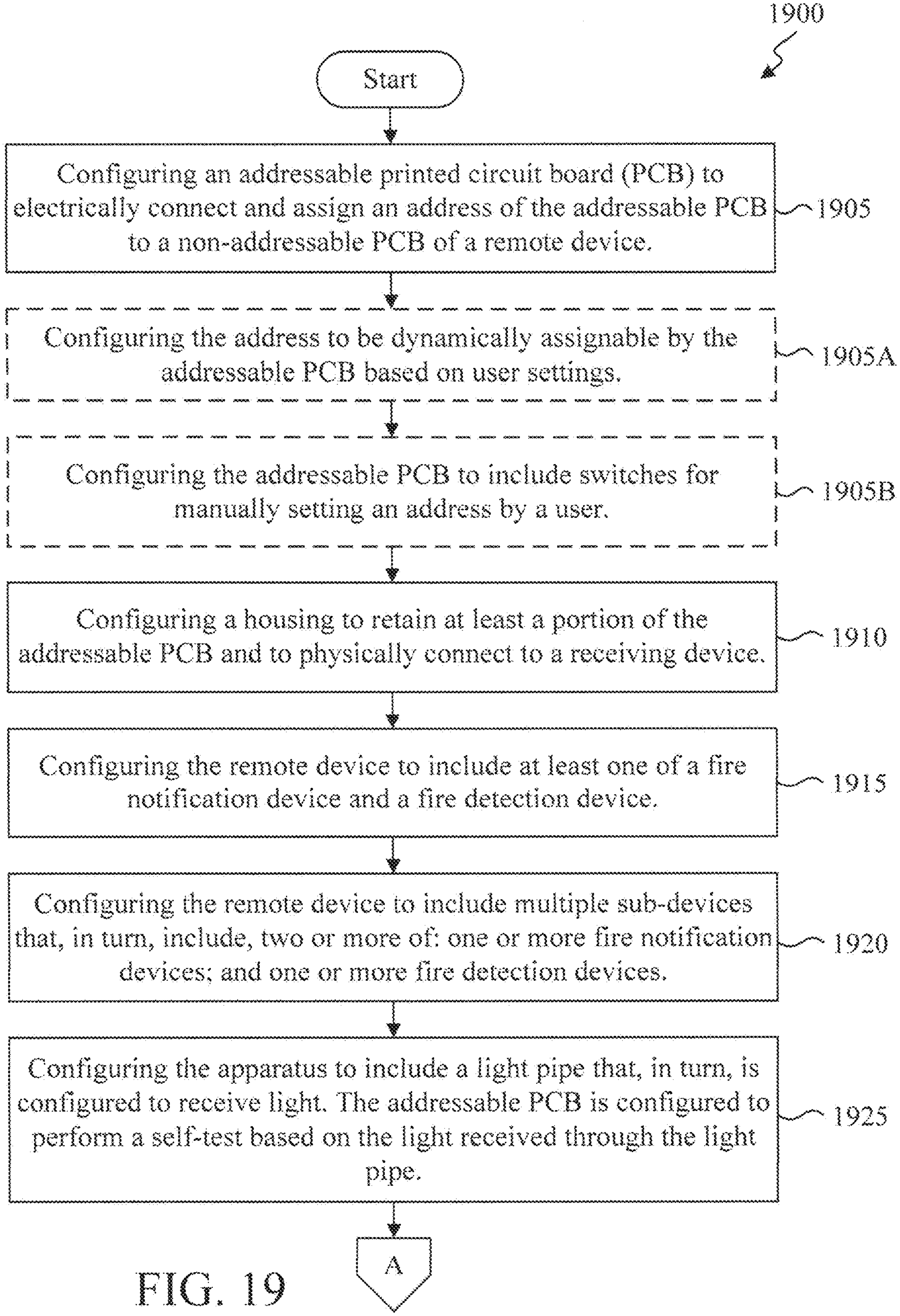
FIGS. 19-25 is a flow diagram of an example method for coupling a remote device to a fire alarm control panel (FACP), in accordance with an exemplary aspect.
Figure 20:
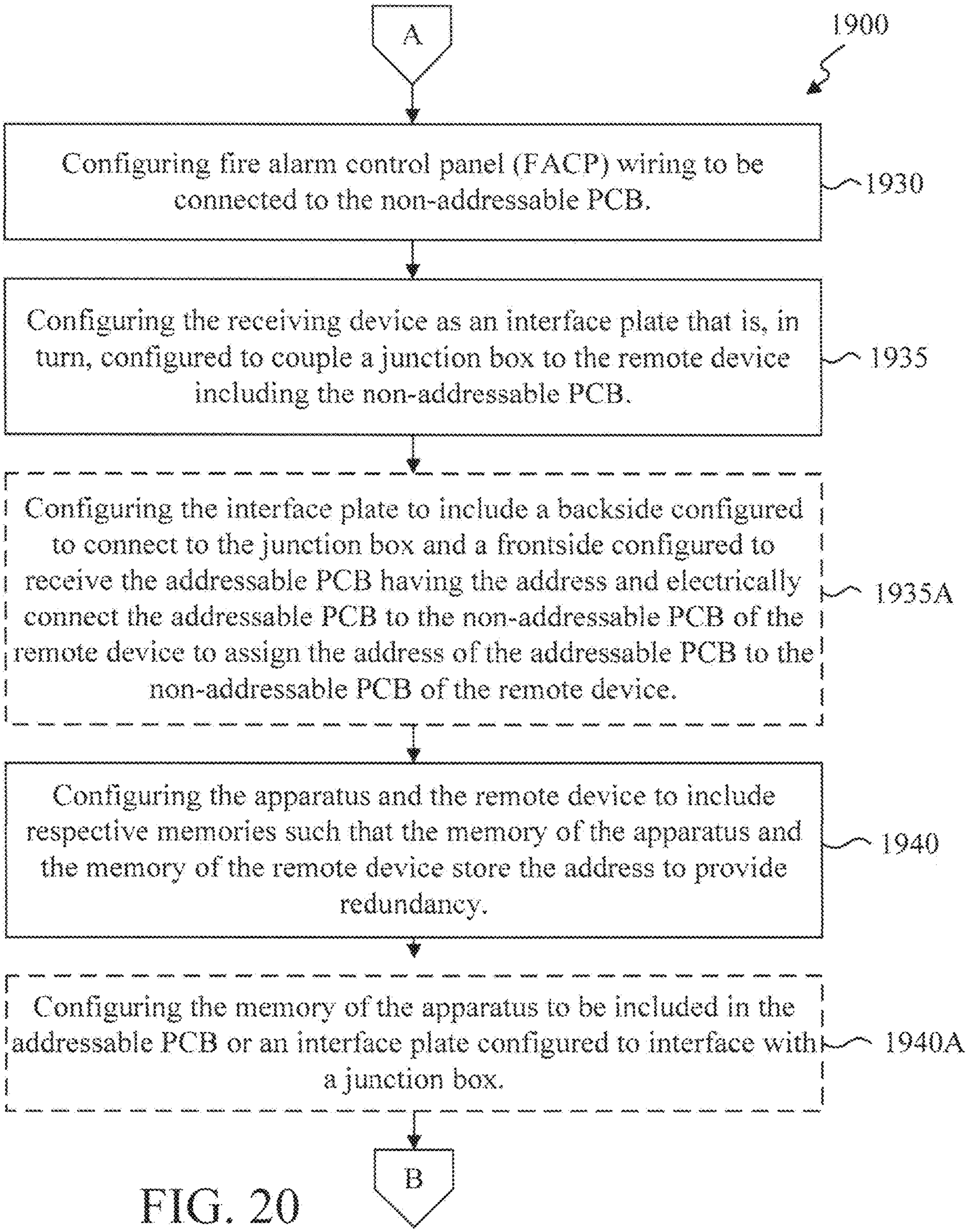
Figure 21:
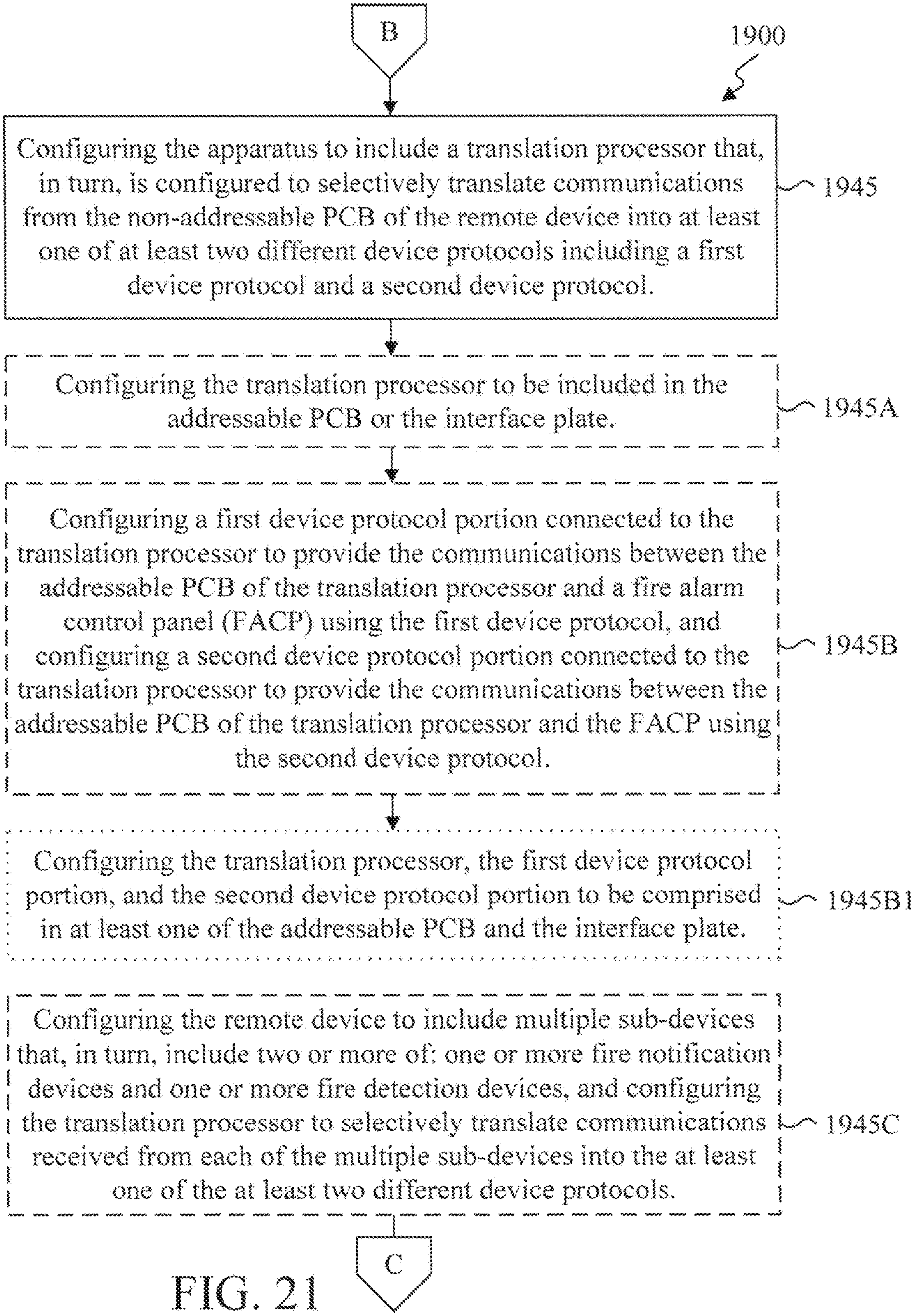
Figure 22:
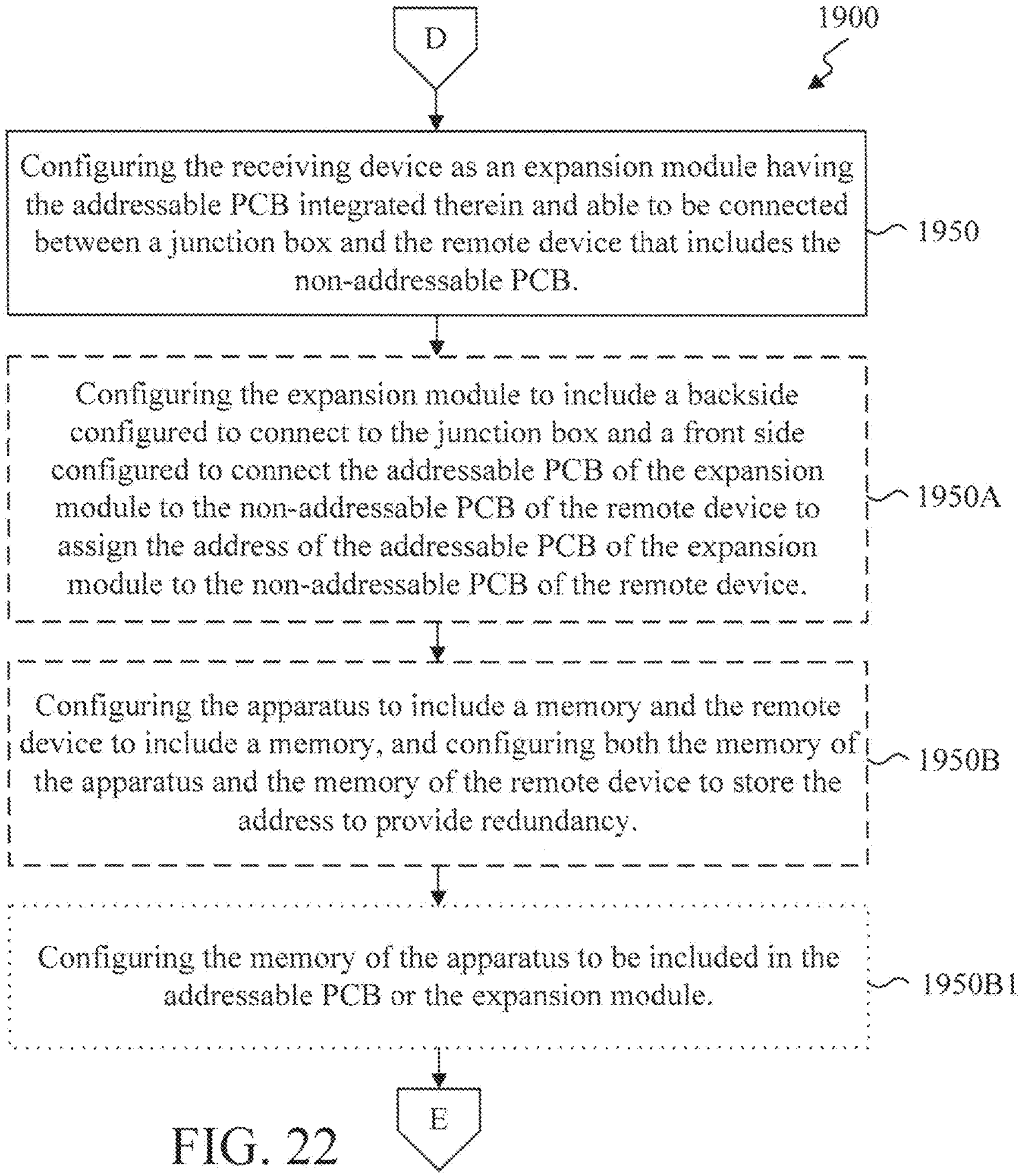
Figure 23:
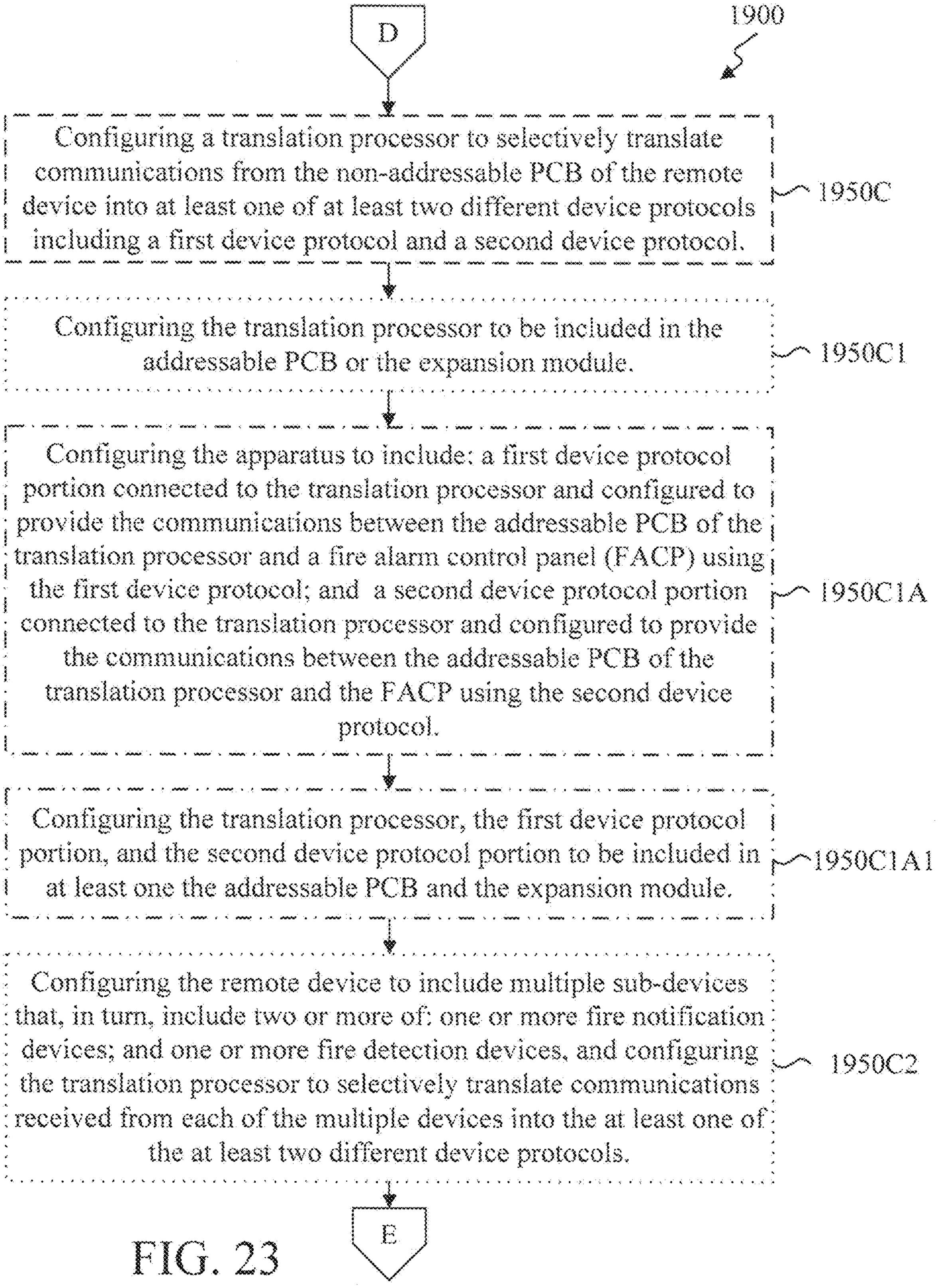
Figure 24:
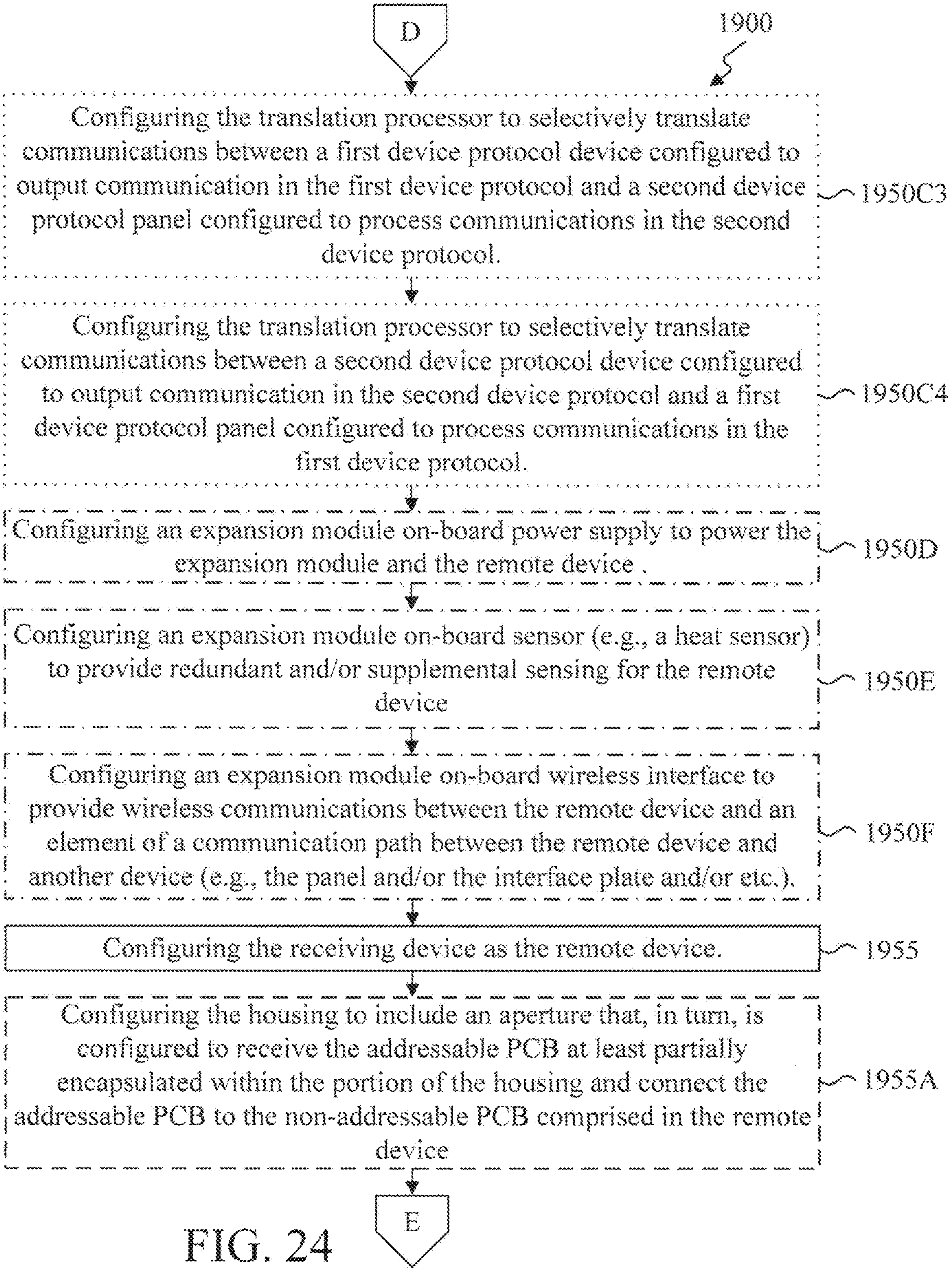
Figure 25:
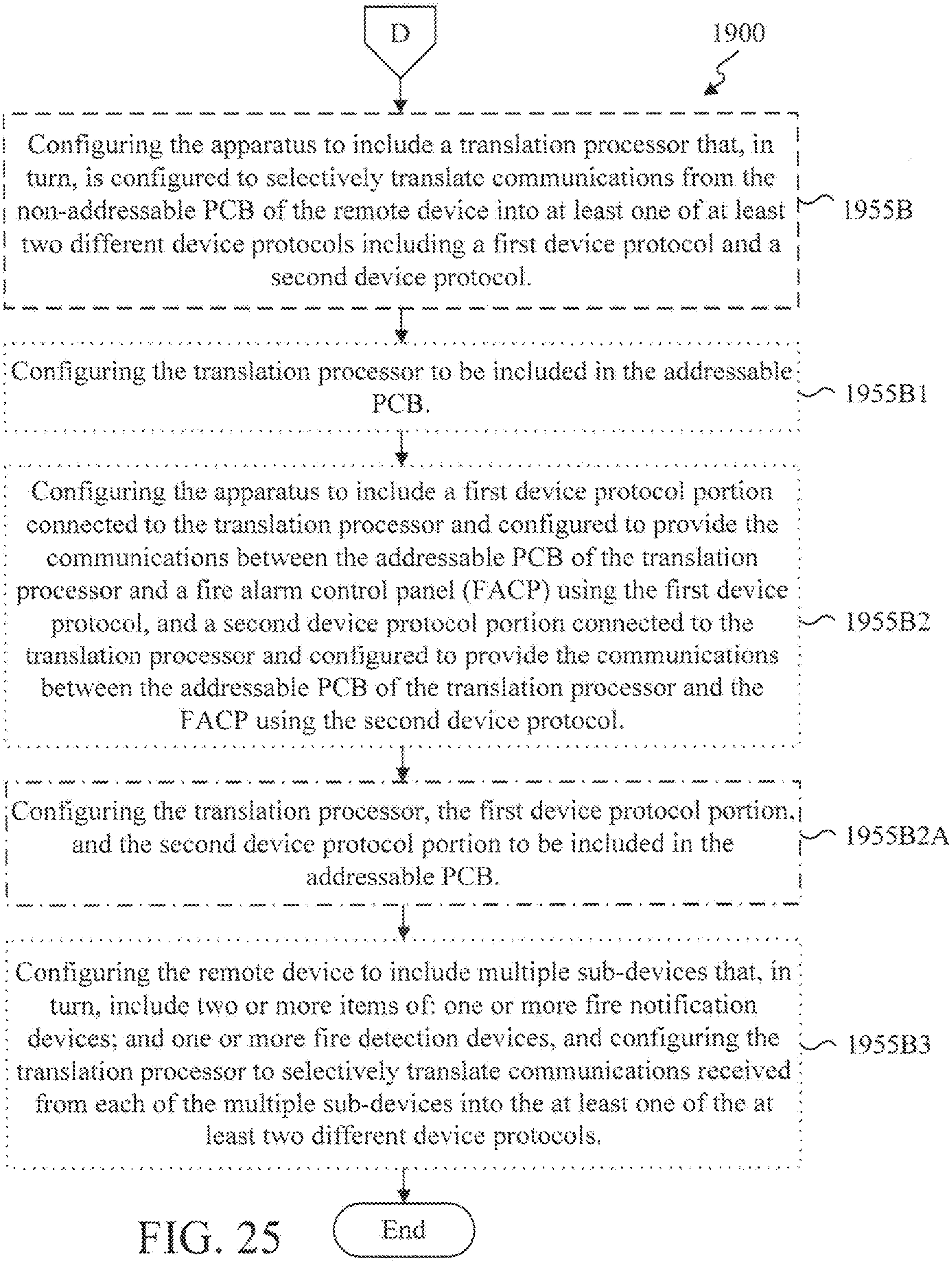

FIGS. 2-3 shows elements of the remote device integrator, and FIGS. 16-18 show a method corresponding to the same.

Figure 15:
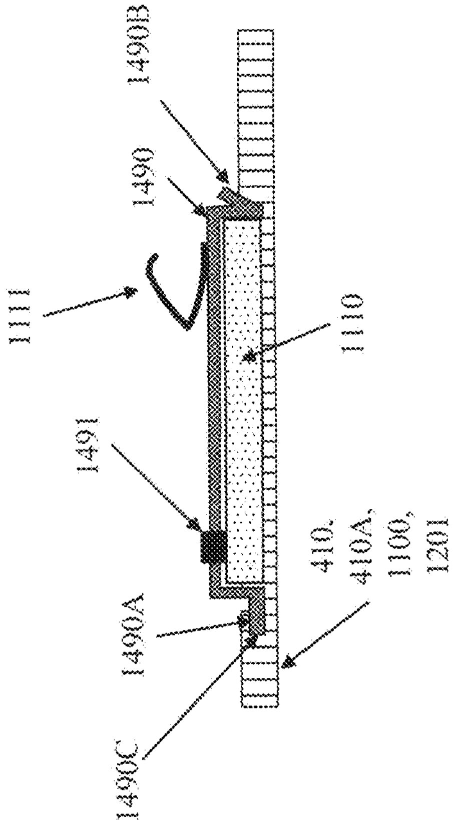
FIG. 15 is a cross-sectional side view of an example interface plate along line A-A, in accordance with an exemplary aspect.

FIGS. 4-10 show elements of the modular hybrid remote device, and FIGS. 15-16 show a method corresponding to the same.

Figure 11:
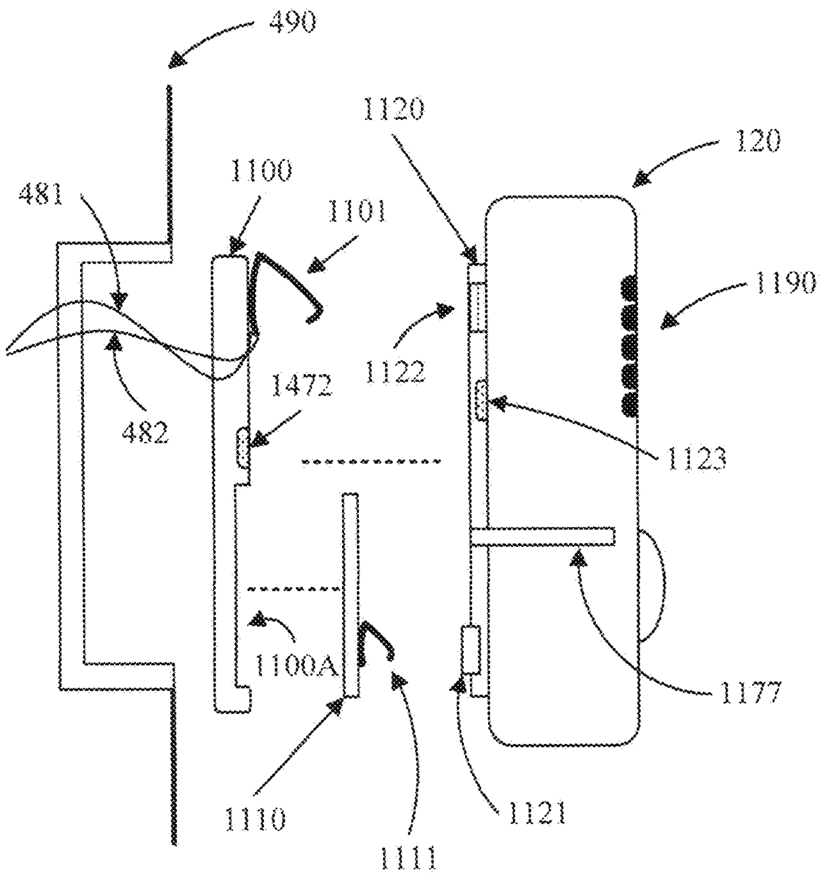
FIG. 11 is a vertical cross-sectional exploded side view of an example interface plate, including an addressable PCB, mountable in a junction box and operable with a remote device, in accordance with an exemplary aspect.
Figure 12:
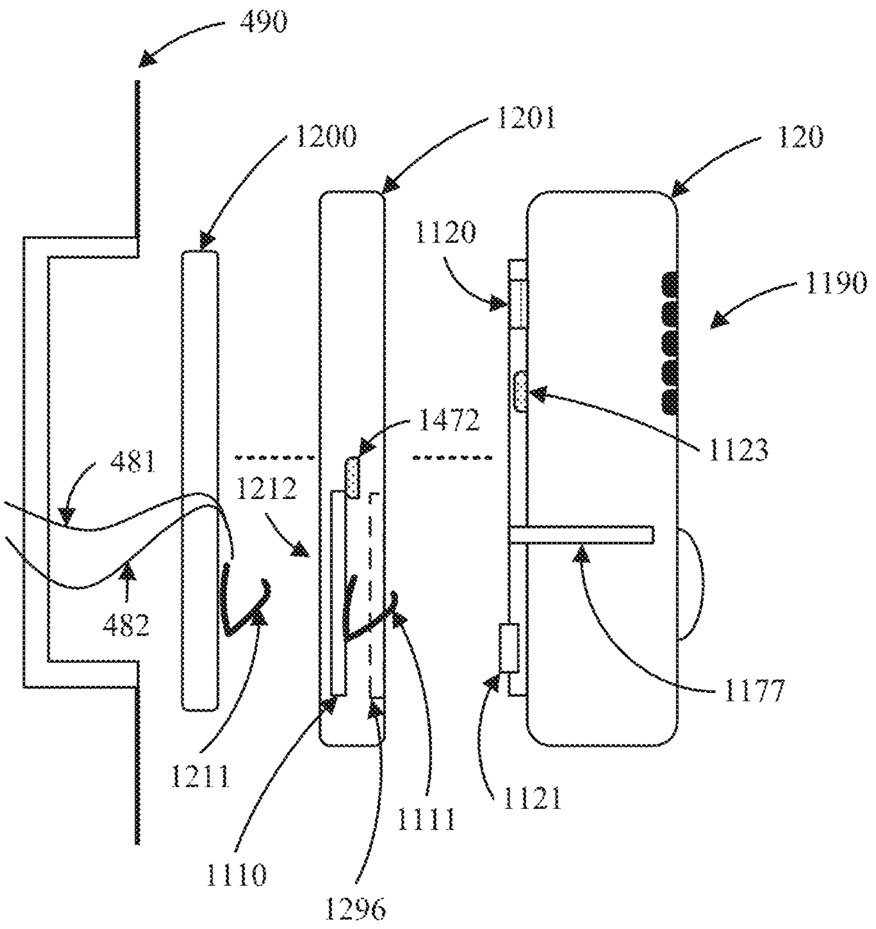
FIG. 12 is a vertical cross-sectional exploded side view of an example expansion module having an addressable PCB, and configurable to be mounted between a remote device and an interface plate configured to be installed on a junction box, in accordance with an exemplary aspect.

FIGS. 11-12 show elements of the addressable PCB, and FIGS. 17-18 show a method corresponding to the same.

It is to be appreciated that references to a frontside and/or backside herein are made for illustrative purposes, and devices on one of those sides may be placed on the other side or on both sides, as readily implemented by one of ordinary skill in the art given the teachings of the disclosure provided herein. For example, PCBs may be mounted on one side, but a connector and/or wiring may pass through the mounting element to be on the other side. Other variations are possible in accordance with and given the teachings of the disclosure provided herein.

Fire Alarm System

Referring now to FIG. 1, an example fire notification system 100, also referred to as a fire alarm system, is shown, according to an exemplary aspect. Fire notification system 100 is a system for providing notification in the case of a fire.

In accordance with various aspects of the disclosure, fire notification system 100 includes remote devices 120, which can be any devices capable of detecting a fire or other emergency condition and relaying audible, visible, or other stimuli to alert building occupants of the fire or other emergency condition. For example, a remote device 120 can include, but is not limited to, any of the following: a smoke detector, a heat detector, a speaker, a microphone, a buzzer, a fire alarm switch (e.g., a pull switch), a light (e.g., LED), and so forth.

Fire notification system 100 can be any system that includes a fire alarm control panel 110 (FACP) and a plurality of remote devices 120 interconnected by fire notification system wiring 130. The FACP 110 is connected via the fire notification system wiring 130 in a loop 140 to the plurality of remote devices 120 such that the loop 140 is bisected or otherwise separated by the FACP 110 into a right side loop 140R and a left side loop 140L. While in the example of FIG. 1, each of the groups represent a set having only 2 members, implementations can have any number of members including in the tens or hundreds or more, and each group may have a different number of members. In an aspect, one of the right side loop 140R or the left side loop 140L correspond to a MX loop and the other one corresponds to a IDNet loop.

Remote devices 120 may be powered by an Alternating Current (AC) or Direct Current (DC) power source (e.g., a battery). Remote devices 120 can include a light notification module and a sound notification module. The light notification module can be implemented as a light emitting device or any component in remote devices 120 that alerts occupants of an emergency by emitting a visible light signal. In some aspects, remote devices 120 emit strobe flashes to alert building occupants of an emergency situation. A sound notification module can be a speaker or any component in the remote devices 120 that alerts occupants of an emergency by emitting an audible signal. In some aspects, which should not be construed as limiting, remote devices 120 may emit one or more audible signals.

The FACP 110 includes one or more memories 191, individually or in combination, having instructions executable by one or more processors 192 to perform the actions described herein to quickly and efficiently connect a new device to a hardware I/O IF. The FACP 110 includes one or more processors 192 each coupled to at least one of the one or more memories 191 and configurable to execute the instructions. The instructions can be, for example, based on method 1600 of FIGS. 16-18, method 1900 of FIGS. 19-25, and method 2600 of FIGS. 26-29.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

In an aspect, FACP 110 further includes a connection port 193 for connecting a remote device (e.g., a laptop, a tablet, etc.), an input device 194 for receiving user inputs, a transceiver 195 for communicating with remote devices (e.g., a remote station, a smart phone, and so forth), and a display 112 for displaying operations. In an aspect, FACP 110 may include a speaker 113 for indicating information such as an alarm (e.g., fire, wire break, etc.), a serial number, a device type, a device status, and so forth and/or a light source (LED) 111 for flashing when there is a fire or a problem. Input device 194 may be a joystick, keypad, keyboard, mouse, touch-screen display, camera, microphone device and/or so forth.

In an aspect, FACP 110 also includes a shared hardware I/O interface 200 described in further detail hereinbelow with respect to FIG. 2. The shared hardware I/O interface 200 is connected (not shown) to right side loop 140R and left side loop 140L.

In an aspect, FACP 110 also includes a wireless hardware I/O interface 300 described in further detail hereinbelow with respect to FIG. 3. The wireless hardware I/O interface 300 is connected (not shown) to right side loop 140R and left side loop 140L.

In an aspect, right side loop 140R corresponds to a first device protocol and left side loop 140L corresponds to a second device protocol. In other aspects, a third and so forth loop may respectively correspond to a third and so forth device protocol. It is to be appreciated that any number of loops and device protocols may be used. However, for the sake of illustration, the description herein is directed to the use of two different loops, each having their own different device protocol.

Remote Device Integrator

Wired Remote Device Integrator

Referring to FIG. 2, the shared hardware I/O interface (IF) 200 of FIG. 1 is shown, in accordance with an exemplary aspect. The shared hardware I/O IF 200 is configured to support at least two different device protocols.

The shared hardware I/O IF 200 includes a first device protocol portion 210, a second device protocol portion 220, one or more translation processors (hereinafter "translation processor") 230, and one or more power supplies (hereinafter "power supply" or "PSU") 290. In other aspects, the shared hardware I/O IF 200 may include more than two device protocol portions corresponding to more than two different device protocols.

The first device protocol portion 210 is configured to implement a first device protocol, and the second device protocol portion 220 is configured to implement a second device protocol. In an aspect, one of the first device protocol or the second device protocol is MX and the other is IDNet. Of course, the preceding device protocols are merely illustrative and, thus, other device protocols may also be used depending upon the implementation. The first device protocol portion 210 and the second device protocol portion 220 are supported by the translation processor 230 and power supply 290 as described hereinbelow. In an aspect, each of the first device protocol and the second device protocol include a corresponding power protocol and a corresponding data protocol.

In the aspect of FIG. 2, the translation processor 230 and the power supply 290 are shared between the first device protocol portion 210 and the second device protocol portion 220 for efficiency sake as well as in consideration of reducing size, cost, and so forth. While the aspect of FIG. 2 shows the translation processor 230 and power supply as being common to both the first device protocol portion 210 and the second device protocol portion 220, in other aspects, dedicated processors and/or power supplies may be used. The aspect shown in FIG. 2 provides efficient, small, and cost effective implementations of the translation processor 230 and the power supply 290.

The first device protocol portion 210 includes a first device protocol loop IF 211 connected to a first device protocol receiver IF 212 and a first device protocol transmitter IF 213. The first device protocol loop IF 211 is configured to be connected to a first device protocol device/panel via interface 281. The first device protocol receiver IF 212 and the first device protocol transmitter IF 213 are connected to the translation processor 230. The first device protocol receiver IF 212 is configured to receive signals in accordance with the first device protocol, and the first device protocol transmitter IF 213 is configured to transmit signals in accordance with the first device protocol.

The second device protocol portion 220 includes a second device protocol loop IF 221 connected to a second device protocol receiver IF 222 and a second device protocol transmitter IF 223. The second device protocol loop IF 221 is configured to be connected to a second device protocol device/panel via interface 282. The second device protocol receiver IF 222 and the second device protocol transmitter IF 223 are connected to the translation processor 230. The second device protocol receiver IF 222 is configured receive signals in accordance with the second device protocol, and the second device protocol transmitter IF 223 is configured to transmit signals in accordance with the second device protocol. In an aspect, the first device protocol uses square or other shaped waves with a known clock at a particular (fixed) baud rate. In an aspect, the second device protocol uses frequency key shifting with sine or other shaped waves at a configurable data rate. In other aspects, other wave types and modulation schemes and other communication specific parameters may be used. It is to be noted that the frequency key shifting is configured to set the data rate.

The translation processor 230 is connected to a serial IF 291 and a hardware I/O IF 292. The serial IF 291 and the hardware I/O IF 292 are configured to be connected to a remote device 120.

In an aspect, the serial IF 291 is based on a proposed reference design, corresponding FACP device drivers and configuration support to manage the remote device for any type of FACP loop interface (e.g., MX, IDNet, etc.) that is shared amongst remote device manufacturers in order to ensure compliance with and exploitation of the serial IF 291.

Figure 4:
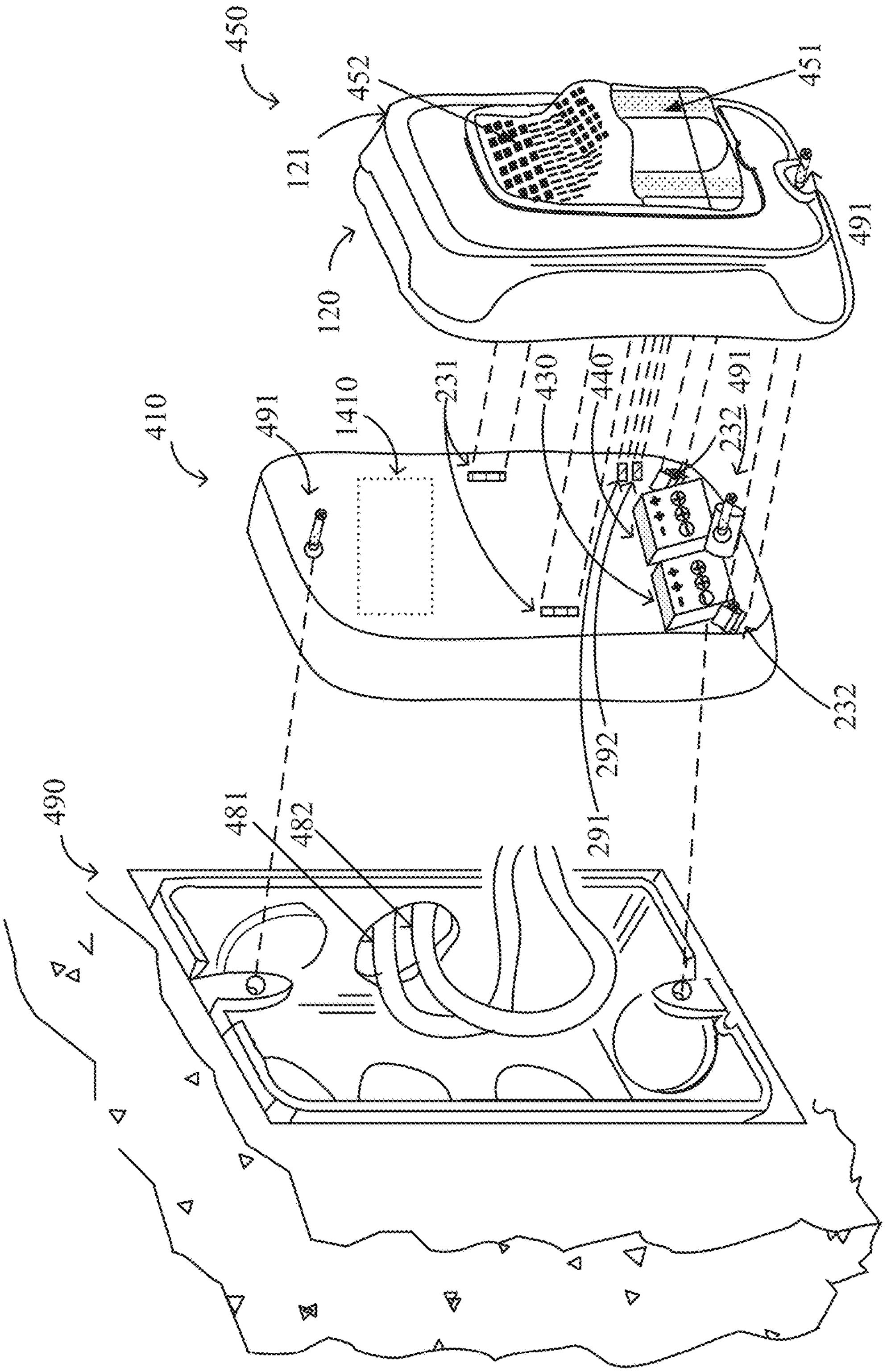
FIG. 4 is an exploded perspective view of an example interface plate configured to be installed on a junction box, and operable with a remote device, in accordance with an exemplary aspect.

In an aspect, the serial IF 291 uses a serial data protocol to communicate data between the remote device 120 and the FACP 110. As shown in FIG. 4, the remote device 120 may include multiple individual detachable modules 450 (also referred to herein as devices or notification devices). In such a case, while data may be communicated serially, such serial communication may involve one or more of time division multiplexing, frequency division multiplexing, frequency key shifting, and other data communication techniques that are compatible with serial data communications. The data provided by the remote device through the serial IF 291 may be in a format in compliance with the above mentioned referenced design. This data is then translated by the translation processor 230 into native device protocols for existing FACP loops (e.g., MX loops, IDNet loops, etc.). Such translation is not necessarily used by the hardware I/O IF 292 described herein, which may have the same data and power protocols/requirements of the FACP loops and thus may not require any or minimum translation.

In an aspect, the hardware I/O IF 292 is based on reference designs, corresponding panel device drivers and configuration support to manage the remote device for any type of existing type of FACP loop interface (e.g., MX, IDNet, etc.). That is, in an aspect, the hardware I/O IF 292 includes multiple existing interfaces that each support a respective one of multiple different device protocols (e.g., different electrical and data protocols).

Thus, a difference between the serial IF 291 and the hardware I/O IF 292 is the use of a single device protocol by the serial IF 291 that is then converted by the translation processor 230 into native device protocols (e.g., MX, IDNet, etc.) for the panel loops in contrast to the use of multiple device protocols by the hardware I/O IF 292.

The translation processor 230 is connected to a serial debug IF 277. The serial debug IF will provide checks on the serial interface 291 including, but not limited to, data compliance and electrical compliance.

The first device protocol portion 210 and the second device protocol portion 220 are connected to and under the control of the translation processor 230. In further detail, the translation processor 230 is configured to convert transmission TX and reception RX data to serial data for transmission using serial IF 291. The translation processor 230 is further configured to provide the hardware I/O IF 292 for additional connection to the remote device 120.

The shared hardware I/O IF 200 is configured to handle all different types of device protocols and their various specific requirements, both in terms of software and software parameters as well as hardware and hardware parameters. In this way, the shared hardware I/O IF 200 may be considered generic to and able to exploit any device protocol.

Figure 30:
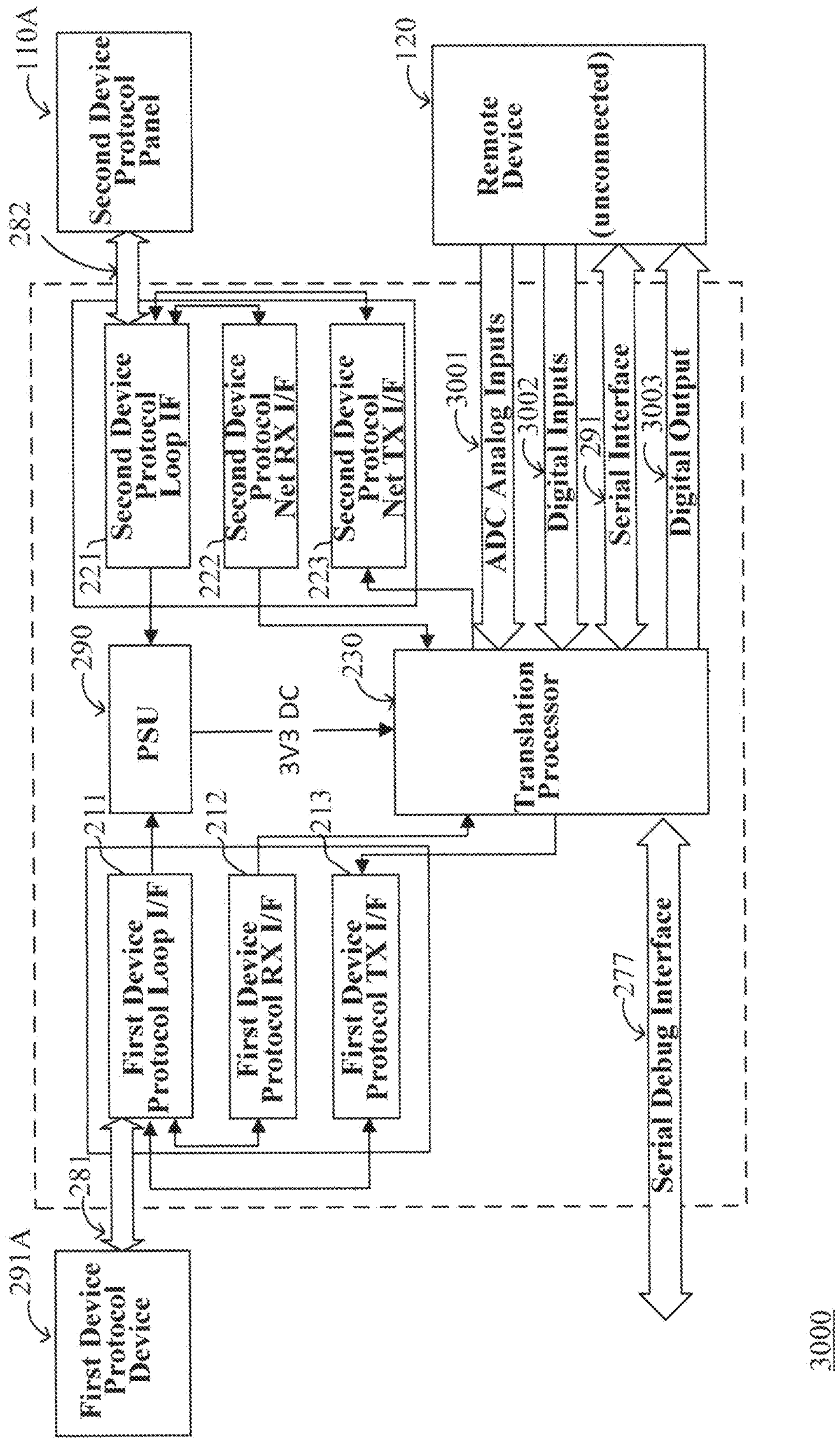
FIG. 30 is a block diagram showing an example device-to-panel connection configuration using the shared hardware I/O IF of FIG. 2, in accordance with an exemplary aspect.

Referring to FIG. 30, an example device-to-panel connection configuration 3000 using shared hardware I/O IF 200 of FIG. 2 is shown.

In the device-to-panel connection configuration 3000, a remote device 120 may or may not be connected. It is shown unconnected for exemplary sake in the example of FIG. 30.

In the device-to-panel connection configuration 3000, a first device protocol device 291A is connected to a second device protocol panel 110A through a path via the first device protocol portion 210, the translation processor 230, and the second device protocol portion 220.

In other aspects, the shared hardware I/O IF 200 may include more than two device protocol portions corresponding to more than two different device protocols, as noted with respect to at least FIGS. 2-3.

The first device protocol device 291A is connected to the first device protocol portion 210 via first device protocol loop 281. The second device protocol panel 110A is connected to the second device protocol portion 220 via the second device protocol loop 282.

The translation processor 230 translates communications in the first device protocol from the first device protocol device 291A into communications in the second device protocol for use by the second device protocol panel 110A. The communications in the second device protocol from the translation processor 230 are provided to the second device protocol portion 220. From there, the communications in the second device protocol are provided via the second device protocol loop 282 to the second device protocol panel 110A.

In the device-to-panel connection configuration 3000, the following interfaces exist between the remote device 120, when connected, and the translation processor 230: analog-to-digital converter (ADC) analog input interface 3001 configured to provide analog inputs from the remote device 120 to the translation processor 230; digital inputs interface 3002 configured to provide digital inputs from the remote device 120 to the translation processor 230; serial interface 291; and digital output interface 3003 for providing digital outputs from the translations processor 230 to the remote device 120.

While device-to-panel configuration 3000 is described using shared hardware I/O IF 200 of FIG. 2, in other aspects, the wireless hardware I/O IF 300 of FIG. 3 may be used instead or in addition to the shared hardware I/O IF 200.

Figure 31:
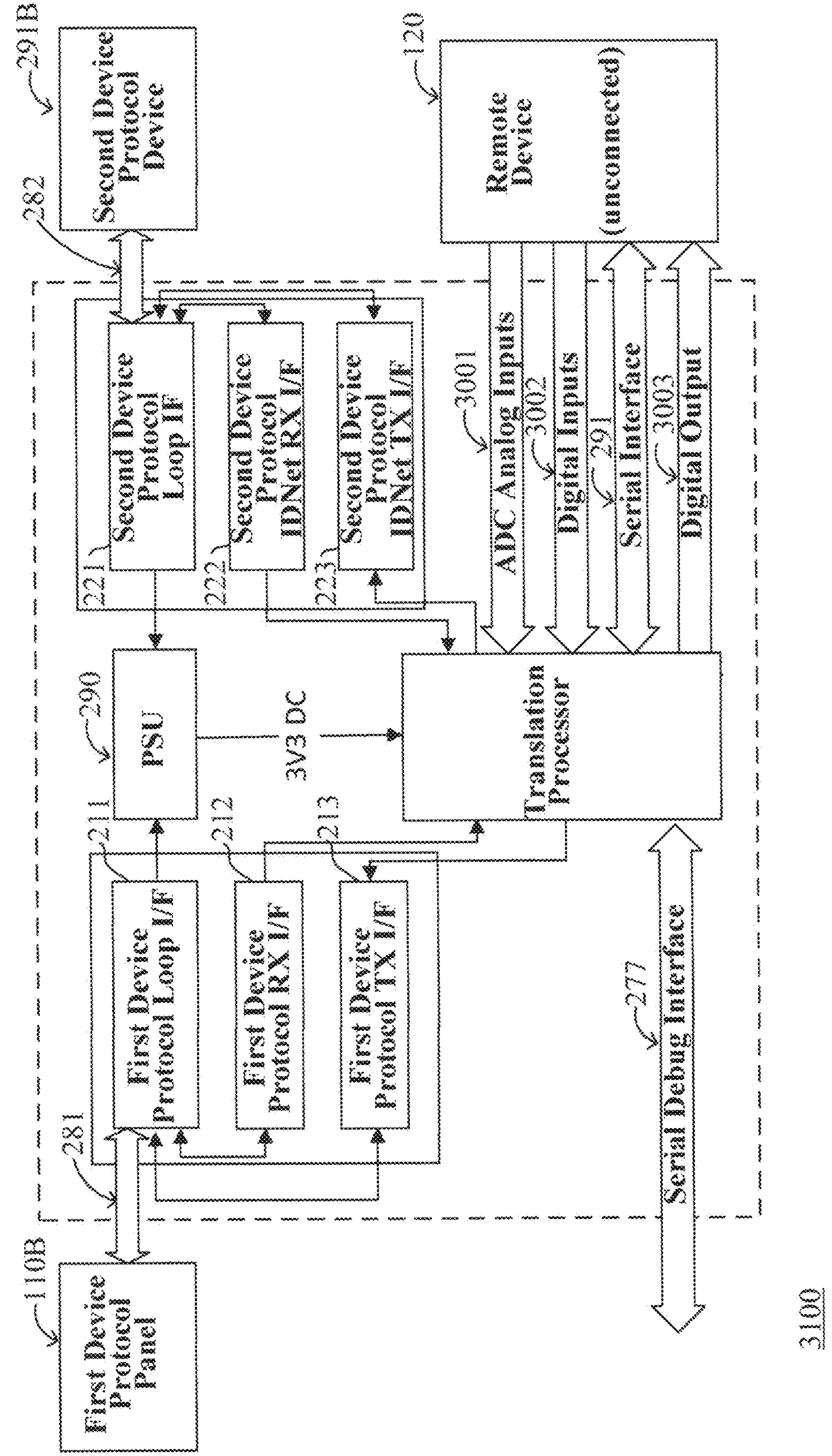
FIG. 31 is a block diagram of an example device-to-panel connection configuration using the shared hardware I/O IF of FIG. 2, in accordance with an exemplary aspect.

Referring to FIG. 31, an example device-to-panel connection configuration 3100 using shared hardware I/O IF 200 of FIG. 2 is shown.

In the device-to-panel connection configuration 3100, a remote device 120 may or may not be connected. It is shown unconnected for exemplary sake in the example of FIG. 31.

In the device-to-panel connection configuration 3100, a first device protocol panel 110B is connected to a second device protocol device 291B through a path via the first device protocol portion 210, the translation processor 230, and the second device protocol portion 220.

In other aspects, the shared hardware I/O IF 200 may include more than two device protocol portions corresponding to more than two different device protocols, as noted with respect to at least FIGS. 2-3.

The first device protocol panel 110B is connected to the first device protocol portion 210 via first device protocol loop 281. The second device protocol device 291B is connected to the second device protocol portion 220 via the second device protocol loop 282.

The translation processor 230 translates communications in the second device protocol from the second device protocol device 291B into communications in the first device protocol for use by the first device protocol panel 110B. The communications in the first device protocol from the translation processor 230 are provided to the first device protocol portion 210. From there, the communications in the first device protocol are provided via the first device protocol loop 281 to the first device protocol panel 110B.

In the device-to-panel connection configuration 3100, the following interfaces exist between the remote device 120, when connected, and the translation processor 230: analog-to-digital converter (ADC) analog input interface 3001; digital inputs interface 3002, serial interface 291, and digital output interface 3003.

While device-to-panel configuration 3100 is described using shared hardware I/O IF 200 of FIG. 2, in other aspects, the wireless hardware I/O IF 300 of FIG. 3 may be used instead or in addition to the shared hardware I/O IF 200.

Wireless Remote Device Integrator

Referring to FIG. 3, an example wireless hardware I/O interface (IF) 300 supporting two different device protocols is shown, in accordance with an exemplary aspect.

The difference between the hardware I/O IF 200 of FIG. 2 and the wireless hardware I/O IF 300 of FIG. 3 is that the serial IF 291 of I/O IF 200 is replaced with a wireless I/O IF 331, and serial debug interface 277 is replaced with a wireless debug interface 377. In an aspect, the wireless I/O IF 331 includes a transceiver. The wireless I/O IF 331 is configured to wirelessly interface with a wireless transceiver 381 of the remote device 120. Any wireless device protocol in existence or to be developed is envisioned to be encompassed by protocols capable of being processed by the preceding wireless I/O IF 331. In an aspect, any one or more of BLUETOOTH, WIFI, cellular, and so forth may be used.

In an aspect, a lower power wireless communication protocol is used. In an aspect, the wireless I/O IF 331 is powered by the power supply 290.

In an aspect, the hardware I/O IF 292 is maintained for backwards compatibility with non-wireless devices. However, in a preferred aspect, the hardware I/O IF 292 is omitted and all communications between the remote device 120 and the translation processor 230 occur via the wireless I/O interface IF 331 and the wireless transceiver 381.

Modular Hybrid Remote Device

Referring to FIG. 4, an example interface plate 410 configured to be installed on a junction box 490 is shown, in accordance with an exemplary aspect.

The interface plate 410 is configured to accommodate one or more devices 450 that are modularly attachable to the remote device 120, Such devices 450 include strobes, speaker, smoke detectors, and so forth. In this way, a single enclosure can enable device modularity and the interchanging of devices, for example, to coincide with changing fire system and/or device requirements and/or capabilities.

A frontside of the interface plate 410 is configured to electrically connect to the junction box 490 (e.g., the power wire 481 and ground wire 482 of the junction box 490 and also to data cables (not shown) of the junction box 490) via a pass through 1410 (see also, FIG. 14), using an electrical IF 420 located on the frontside of the interface plate 410. described further herein below with respect to FIGS. 4-5.

The interface plate 410 is configured to physically attach to the junction box 490, for example, using mechanical or other connectors such as screws 491 as shown (or tabs, compression fittings, magnets, and/or so forth in other aspects). It is to be appreciated that any type of capable connector can be used.

A frontside of the interface plate 410 includes hardware connectors 231 and 232 for physically coupling the remote device 120 to the interface plate 410.

The frontside of the interface plate 410 further includes the electrical IF 420 that, in turn, includes a set of first device terminals 430 and a set of second device terminals 440 for electrically coupled to the remote device 120 to the interface plate 410.

A backside of a remote device 120 is configured to electrically connect to a frontside of the interface plate 410, for example, using the set of first device terminals 430 and the set of second device terminals 440. In the aspect of FIG. 4, connections for two different devices, also referred to as detachable modules, are provided. In other aspects, connections for three or more different devices may be provided. The devices can be stacked as shown or arranged side-by-side (not shown) or in a matrix (not shown). For example, in an aspect (not shown), two notification devices (e.g., a speaker and a strobe) and one detection device (e.g., smoke detector) are integrated into a single remote device 120.

The frontside of the remote device 120 is configured to selectively electrically (and physically) connect to individual detachable modules 450 that result in the remote device 120 implementing the following configurations of one or more devices: strobe 451 only (with cover plate); speaker 452 only (with cover plate); and strobe 451 and speaker 452 together. For the sake of illustration, the last configuration (strobe 451 and speaker 452 together) is shown in FIG. 4, with other configurations shown in FIGS. 6-7. It is to be appreciated that while a speaker 452 and strobe 451 are both shown for the sake of illustration, other types of detachable modules 450 can be integrated into remote device 120 including but not limited to, aspirating smoke detectors, beam detectors, and so forth.

While shown in the vertically mounted junction box, the junction box 490 can be oriented horizontally in other aspects such as, but not limited to, ceiling mounting. The junction box 490 can be concealed within or flush with a wall/ceiling.

Figure 5:
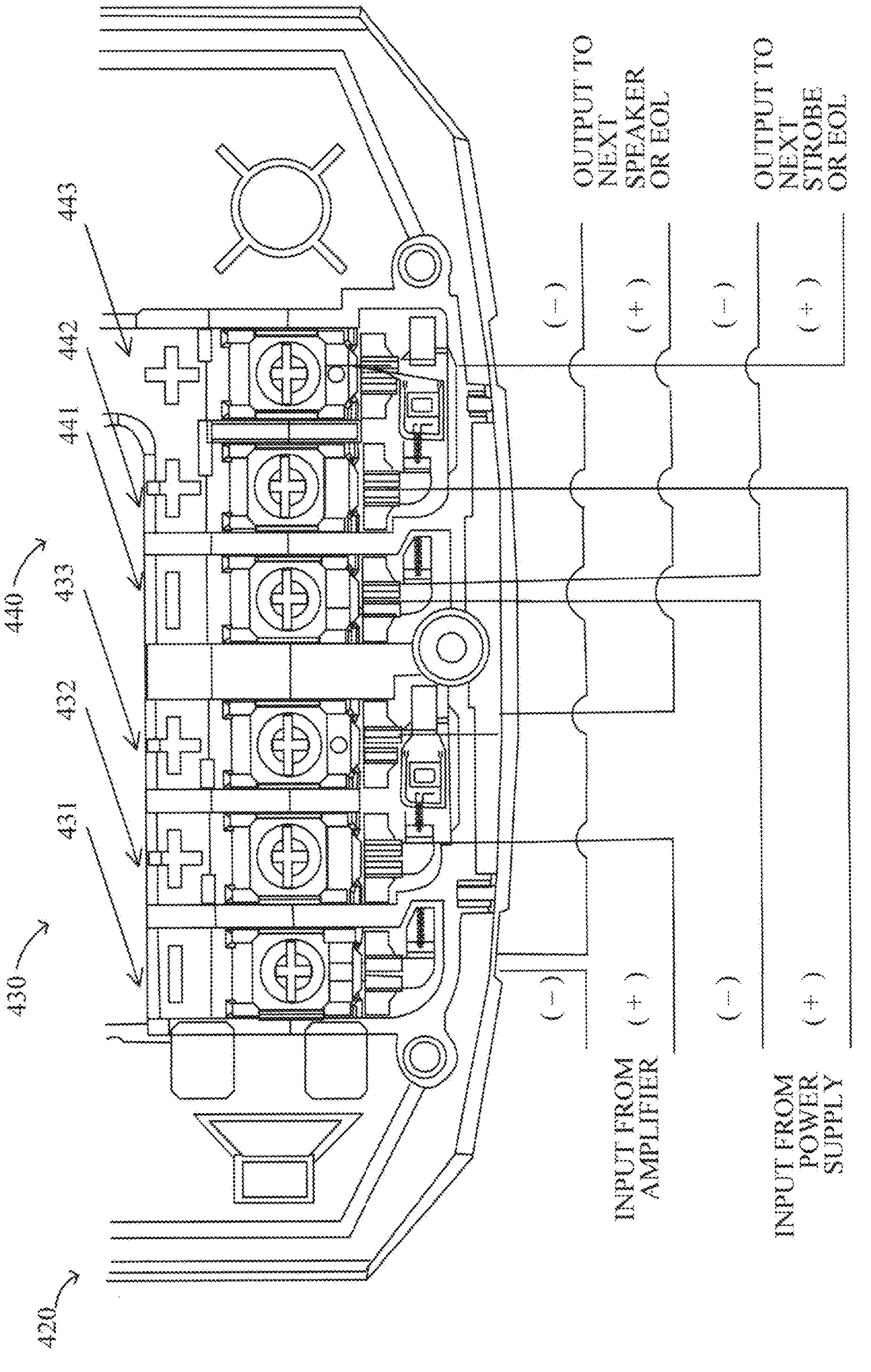
FIG. 5 is a partial front view of an example of the electrical IF of FIG. 4, in accordance with an exemplary aspect.

Referring to FIG. 5, an example of the electrical interface (IF) 420 of FIG. 4 is shown, in accordance with an exemplary aspect.

The electrical IF 420 includes a set of first device terminals 430 and a set of second device terminals 440. In an aspect, the set of first device terminals 430 may correspond to terminals for a speaker, and the set of second device terminals 440 may correspond to terminals for a strobe. In other aspects, other devices may be used in place of and/or in addition to a speaker and/or a strobe.

The set of first device terminals 430 include a negative power terminal 431 that is shared between the input from an amplifier (not shown) and an output to a next device (e.g., a next speaker, an end of line (EOL) resistor, and so forth). The set of first device terminals 430 include a first positive power terminal that is configured to be connected to a positive power terminal 432 of the amplifier. The set of first device terminals 430 include a second positive power terminal 433 that is configured to be connected to a positive power terminal of the next device.

The set of second device terminals 440 include a negative power terminal 441 that is shared between the input from the amplifier and an output to another next device (not shown, e.g., a next strobe, an end of line (EOL) resistor, and so forth). The set of second device terminals 440 include a first positive power terminal 442 that is configured to be connected to a positive power terminal of the amplifier. The set of second device terminals 430 include a second positive power terminal 443 that is configured to be connected to a positive power terminal of the other next device.

Figure 6:
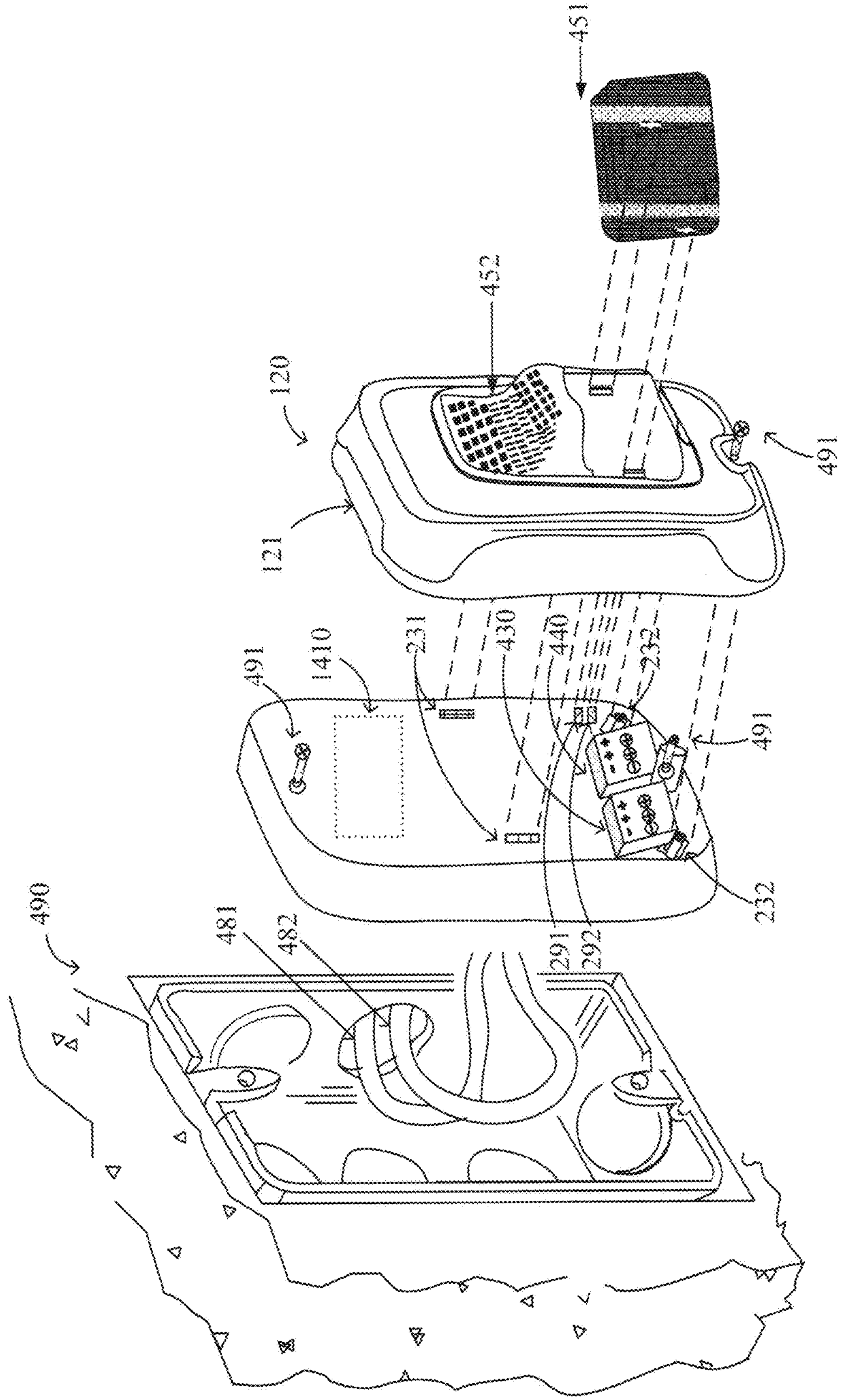
FIG. 6 is an exploded perspective view of the interface plate and remote device of FIG. 4 showing the strobe of FIG. 4 being removed from the remote device, in accordance with an exemplary aspect.
Figure 7:
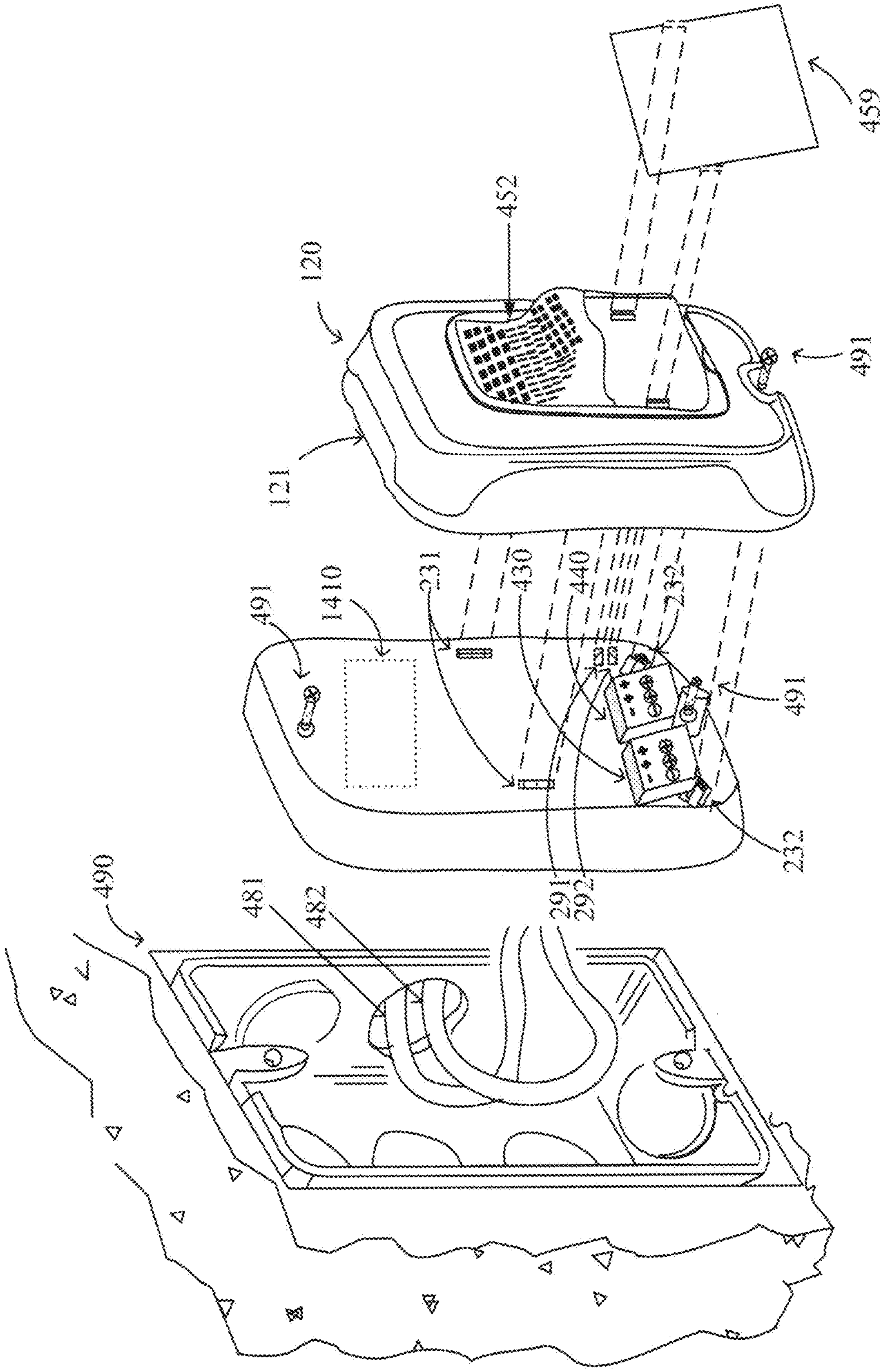
FIG. 7 is an exploded perspective view of the interface plate and remote device of FIG. 4 showing a strobe cover plate replacing the strobe of FIG. 4, in accordance with an exemplary aspect.

Referring to FIGS. 6-7, another example configuration of device 120 of FIG. 4 including only a speaker 452 is shown, in accordance with an exemplary aspect. This is in contrast to the configuration 401 of FIG. 4 that included both the speaker 452 and the strobe 451.

The strobe 451 is removed in FIG. 6 and replaced with a strobe cover plate 459 in FIG. 7.

In the aspects of FIGS. 4-9, the set of first device terminals 430 and the set of second device terminals 440 are configured to connect the individual modules 450 to the remote device 120.

Figure 8:
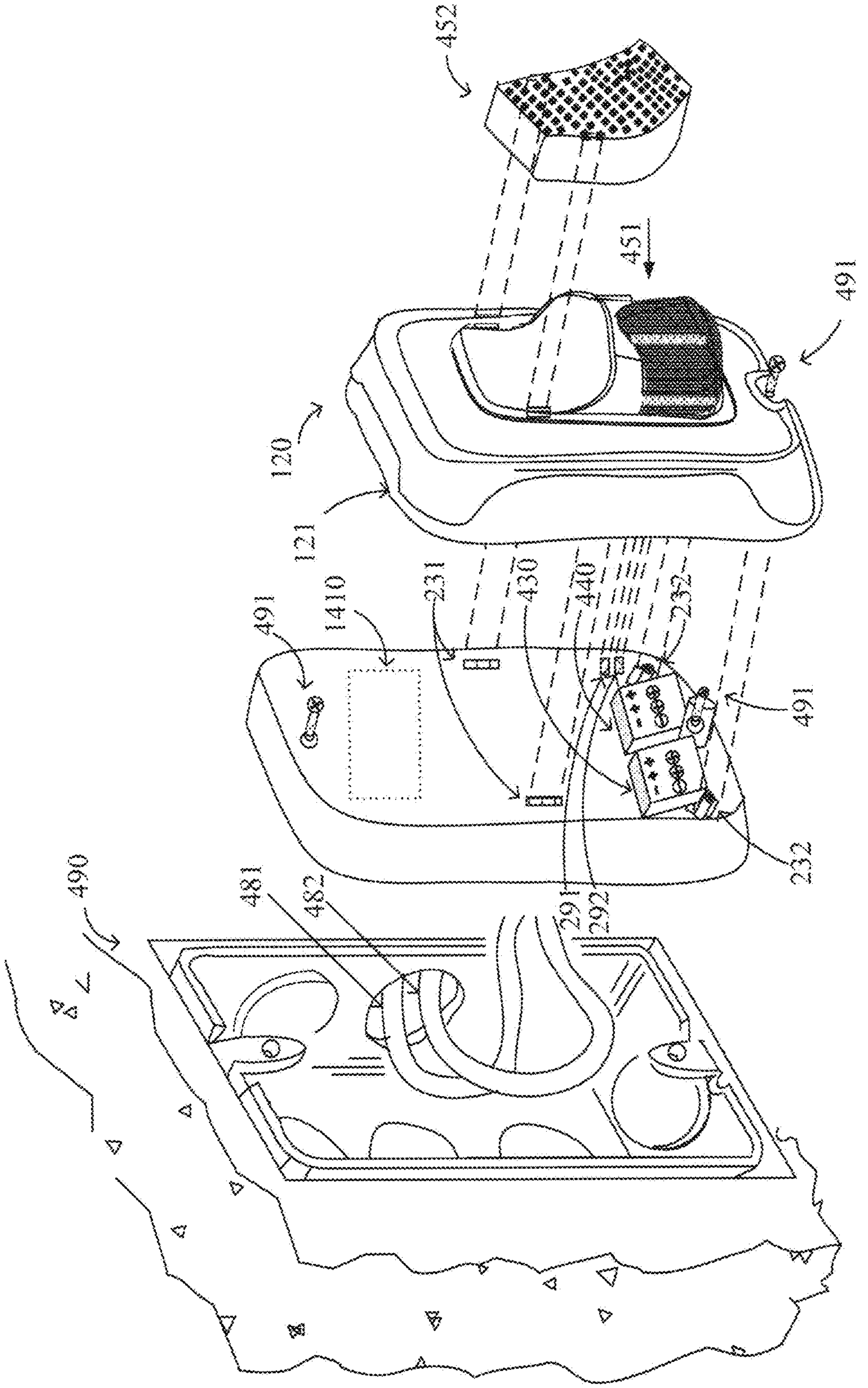
FIG. 8 is an exploded perspective view of the interface plate and remote device of FIG. 4 showing the speaker of FIG. 4 being removed, in accordance with an exemplary aspect.
Figure 9:
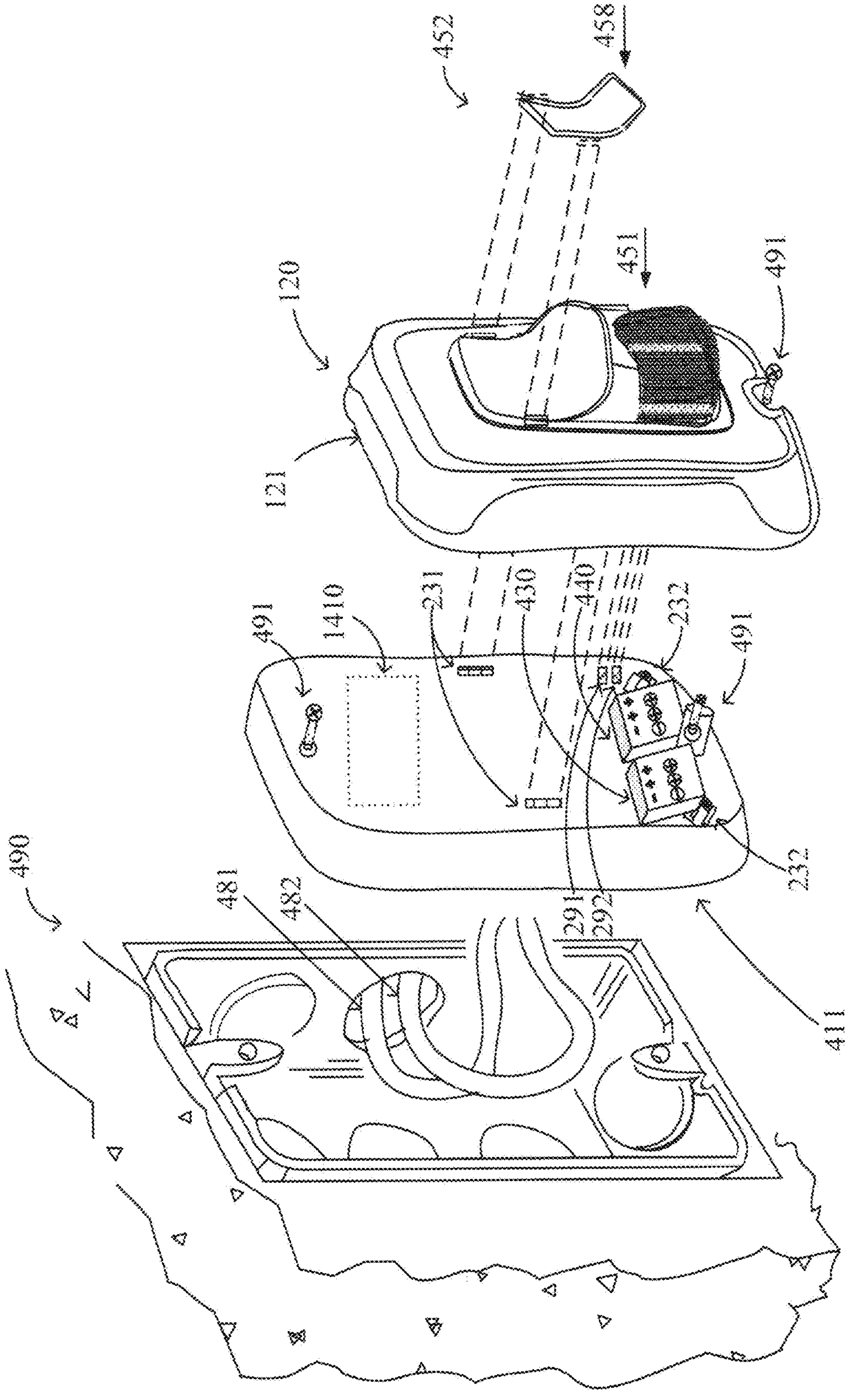
FIG. 9 is an exploded perspective view of the interface plate and remote device of FIG. 4 showing a speaker cover plate replacing the speaker of FIG. 4, in accordance with an exemplary aspect.

Referring to FIGS. 8-9, another example configuration of device 120 of FIG. 4 including only a strobe 451 is shown, in accordance with an exemplary aspect. This is in contrast to the configuration 401 of FIG. 4 that included both the speaker 452 and the strobe 451.

The speaker 452 is removed in FIG. 8 and replaced with a speaker cover plate 458 in FIG. 9.

Figure 10:
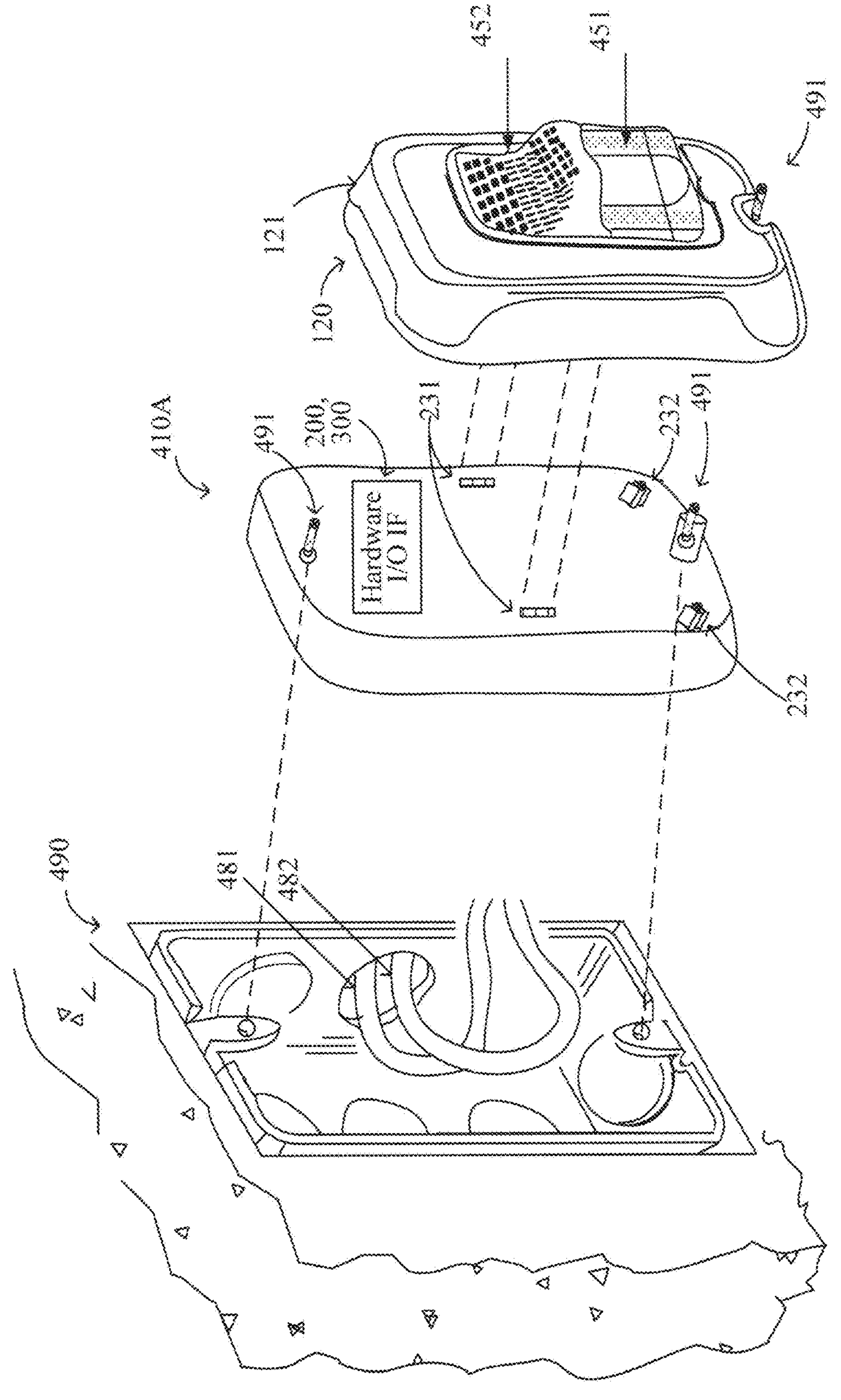
FIG. 10 is an exploded perspective view of an example interface plate configured to be installed on a junction box, and operable with a remote device, in accordance with an exemplary aspect.

Referring to FIG. 10, an example interface plate 410A configured to be installed on a junction box 490 is shown, in accordance with an exemplary aspect.

The interface plate 410A is configured to physically attach to the junction box 490, for example, using mechanical or other connectors such as screws 491 as shown (or tabs, compression fittings, magnets, and/or so forth in other aspects).

In contrast to the interface plate 410 of FIG. 4 and FIGS. 6-9, the interface plate 410A of FIG. 10 includes the serial hardware I/O IF 200 of FIG. 2 (including the serial IF 291 and the hardware I/O IF 292) or the wireless hardware I/O interface 300 of FIG. 3 (including the wireless I/O IF 331), depending upon the aspect. In this way, the serial I/O IF 200 or the wireless hardware I/O interface 300 may be integrated into a hybrid notification device having one or more detachable modules 450 in order to interface with the same. While not shown in FIG. 10, field wires access areas 1410 may remain to allow access for wiring.

A backside of a remote device 120 is configured to electrically connect to a frontside of the interface plate 410, for example, using the serial IF 291 and/or the hardware I/O IF 292. In the aspect of FIG. 2, two serial connectors are provided in the serial IF 291, and two hardware I/O connectors (e.g., terminal banks) are provided in the hardware I/O IF 292. In another aspects, three or more serial connectors and three or more hardware I/O connectors may be provided for connecting up to three (or more devices). The devices can be stacked as shown or arranged side-by-side (not shown) or in a matrix (not shown). For example, in an aspect, two notification devices (e.g., a speaker and a strobe) and one detection device (e.g., smoke detector) are integrated into a single remote device 120.

The frontside of the remote device 120 is configured to selectively electrically (and physically) connect to individual detachable modules 450 that result in the remote device 120 implementing the following configurations: strobe 451 only; speaker 452 only; and strobe 451 and speaker 452 together. For the sake of illustration, the last configuration (strobe 451 and speaker 452 together) is shown in FIG. 10, with other configurations shown in FIGS. 6-7. It is to be appreciated that while a speaker 452 and strobe 451 are both shown for the sake of illustration, other detachable modules 450 can be integrated into remote device 120 including but not limited to, aspirating smoke detectors, beam detectors, and so forth.

While shown in the vertically mounted junction box, the junction box 490 can be oriented horizontally in other aspects such as, but not limited to, ceiling mounting. The junction box 490 can be concealed within or flush with a wall/ceiling.

Addressable Pcb

Figure 13:
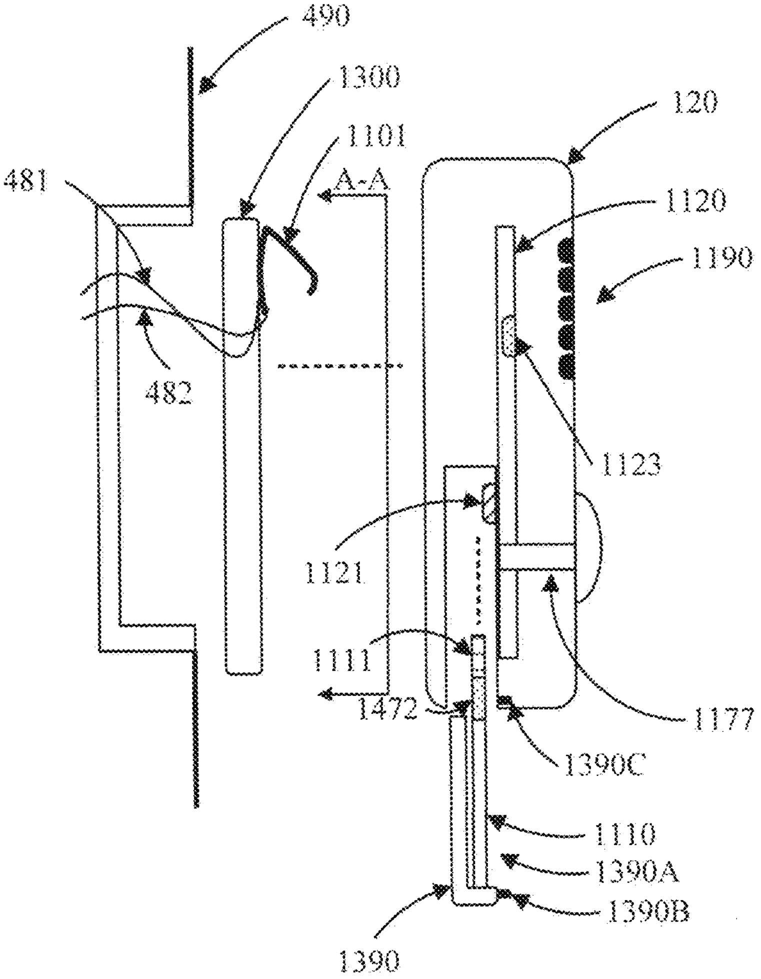
FIG. 13 is a vertical cross-sectional exploded side view of an example remote device having a slot or aperture for an addressable PCB, wherein the remote device is configured to mount to an interface plate attachable to a junction box, in accordance with an exemplary aspect.

FIGS. 11-13 relate to different aspects of an addressable PCB being interfaced with a non-addressable PCB on a remote device. In this way, the address set on the addressable PCB can be transferred to the non-addressable PCB. In each aspect, a junction box is covered by an interface plate that functions as a specialized junction box cover plate with electrical connections. The addressable PCB may be located in the interface plate in an aspect (FIG. 11), in an expansion module in between the interface plate and the remote device in another aspect (FIG. 12), and in a receiving slot/aperture in the remote device itself in yet another aspect (FIG. 13).

Referring to FIG. 11, an example interface plate 1100 configured to retain an addressable PCB 1110 is shown, in accordance with an exemplary aspect.

The interface plate 1100 is configured to include a slot or aperture 1100A for receiving an addressable PCB 1110. For example, the slot or aperture 1100A may be a recessed area on a surface of the interface plate having a length, width, and depth sized to receive the addressable PCB 1110 having a similar or slightly smaller length, width, and depth as shown in FIG. 11.

In another aspect, the slot may be arranged on a side of the interface plate 1100 with an open channel/slot on the surface facing the back of the remote device 120 and aligned with the connector 1121.

Any other arrangement with respect to integrating and/or otherwise adding an addressable PCB 1110 to an interface plate 1100 that aligns with connectors on a non-addressable PCB 1120 of a remote device 120 may be used.

In an aspect, power to the interface plate 1100 may be provided by power wire 481 and ground wire 482 of the junction box 490.

In an aspect, the interface plate 1100 has one or more connectors 1101 configured to interface with one or more connectors 1122 of a non-addressable PCB 1120 of a remote device 120. In an aspect, a connector 1101 may be spring contact, and a mating connector 1122 may be a metallic or other conductive surface. Any type of connectors may be used to connect the interface plate 1100 to the non-addressable PCB 1120.

In an aspect, the addressable PCB 1110 has one or more connectors 1111 configured to interface with one or more connectors of a non-addressable PCB 1120 of a remote device 120. In an aspect, a connector 1111 may be spring contact, and a mating connector 1121 may be a metallic or other conductive surface. Any type of connectors may be used to connect the addressable PCB 1110 to the non-addressable PCB 1120.

Other connector arrangements are possible while maintaining the concept of an interface plate configured to receive an addressable PCB for mating with a non-addressable PCB of a remote device.

In an aspect, the remote device 120 includes a screen portion 1190 configured to allow sound to pass therethrough.

In an aspect, the interface plate 1100 includes a light pipe 1177 configured to aid in self-testing of the addressable PCB 1110.

Referring to FIG. 12, an example expansion module 1201 having an addressable PCB 1110 is shown, in accordance with an exemplary aspect. This configuration is desirable in that expansion modules 1201 can be formed to include replaceable or fixed addressable PCBs 1110 that can be readily supplemented with other elements such as additional memories and the like for additional functionality.

The addressable PCB 1110 may be integrated into the expansion module 1201 having an interface plate 1200 on one side and a remote device 120 on the other.

In an aspect, the addressable PCB 1110 is embedded within the expansion module 1201 as shown in FIG. 12.

In another aspect, the addressable PCB 1110 is selectively attachable to the expansion module 1201 using snap-in housing 1490 shown in FIG. 15. In such a case, expansion module 1201 may include a recess 1296 (shown in dotted lines in FIG. 12) to allow the snap-in housing 1490 to engage and mate with the expansion module 1201.

In an aspect, power to the interface plate 1200 may be provided by power wire 481 and ground wire 482 of the junction box 490.

In an aspect, the interface plate 1200 has one or more connectors 1211 configured to contact to one or more connectors 1212 of the expansion module 1201. In an aspect, a connector 1211 may be spring contact, and a mating connector 1212 may be a metallic or other conductive surface. Any type of connectors may be used to connect the interface plate 1200 to the expansion module 1201.

In an aspect, the addressable PCB 1110 has one or more connectors 1111 configured to interface with one or more connectors 1121 of a non-addressable PCB 1120 of a remote device 120. In an aspect, a connector 1111 may be spring contact, and a mating connector 1121 may be a metallic or other conductive surface. Any type of connectors may be used to connect the addressable PCB 1110 to the non-addressable PCB 1120.

Other connector arrangements are possible while maintaining the concept of an expansion module having an addressable PCB for mating with a non-addressable PCB of a remote device and configured to be arranged in between an interface plate and the remote device.

Figure 32:
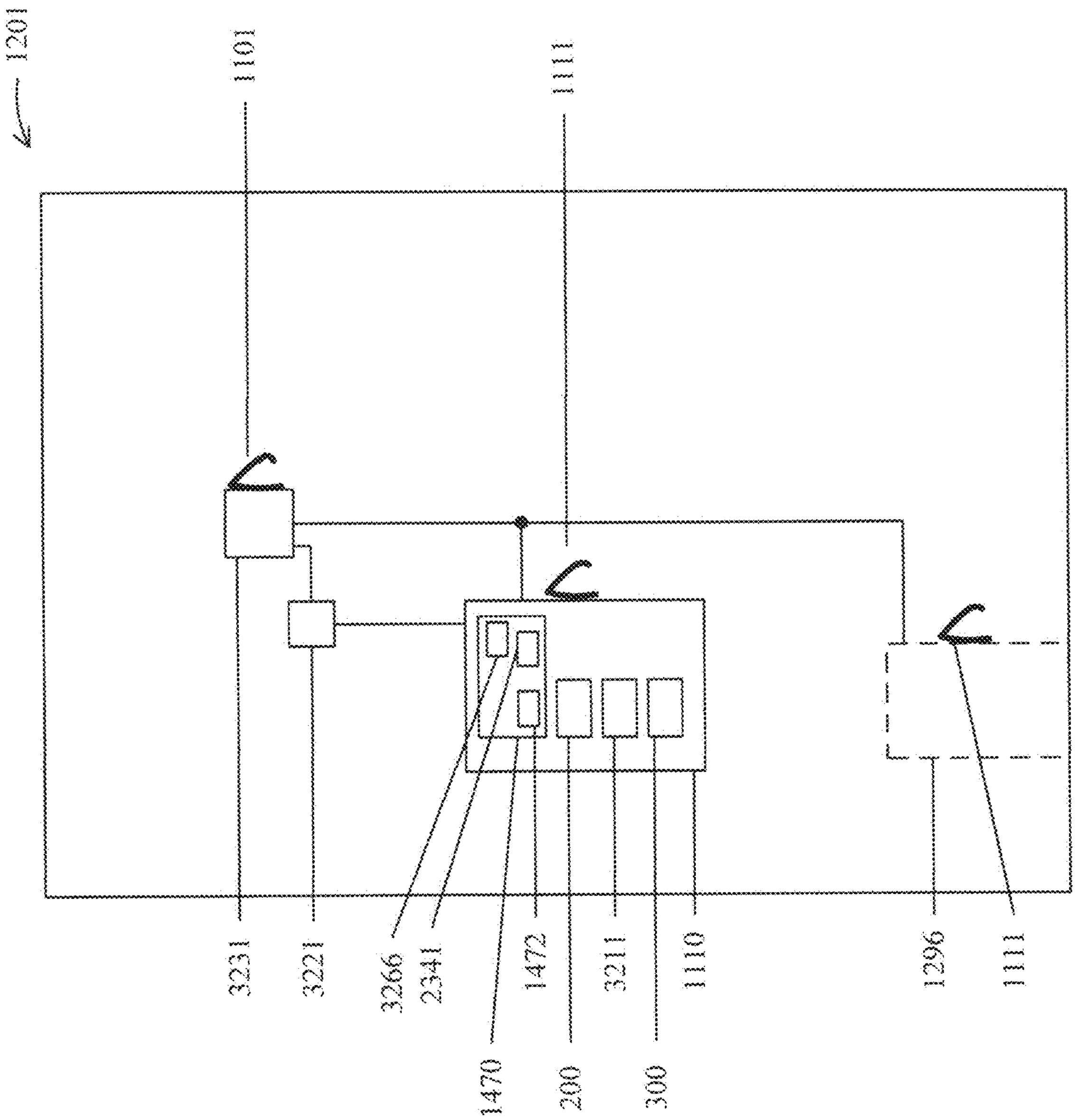
FIG. 32 is a diagram of another view of the expansion module of FIG. 12, in accordance with an exemplary aspect.

Referring to FIG. 32, another view of expansion module 1201 of FIG. 12 is shown, in accordance with an exemplary aspect.

In an aspect, the expansion module 1201 may include the addressable PCB 1110 as an integrated element and/or may include a recess 1296 to receive a snap-in housing (e.g., snap-in housing 1490 of FIG. 14) that holds the addressable PCB 1110. In an aspect, a default addressable PCB 1110 may come integrated into the unit and may be upgradeable by adding an updated version of PCB 1110 to the expansion module 1201 as new functionality becomes available or is called for by an upgraded fire specification code. The updated version of the addressable PCB 1110 may have additional and/or updated functionality.

In an aspect, the expansion module 1201 may include the addressable PCB 1110 which may, in turn, include a PCB 1470 that may, in turn, include a memory 1472.

In an aspect, the addressable PCB 1110 may include any of the hardware I/O IF 200 of FIG. 2 and the wireless hardware I/O IF 300 of FIG. 3. In this way, communication between remote devices 120 (including detachable modules 450) and panels 110, 110A, 110B having different protocols can be achieved.

In an aspect, the expansion module 1201 or an element thereof such as addressable PCB 1110 or PCB 1470 may include a wireless interface 1211 for converting analog or digital signals from the remote device 120 to signals capable of being received by a transceiver 195 of the panel 110, 110A, 110B and/or the interface plate 1200 and/or another device. Wireless interface 1211 may include one or more analog-to-digital converters, particular protocol elements such as protocol translators, receivers, transmitters, loop interfaces, and so forth, to enable communication between a "base" conventional device and a panel 110, 110A, 110B and/or the interface plate 1200 and/or another device. Thus, in an aspect, the expansion module 1201 wirelessly communicates with a wireless interface of the panel 110, 110A, 110B and/or the interface plate 1200 and/or another device. In an aspect, the interface plate 1200 may include a wireless interface (not shown) to enable wireless communication therebetween in place of or in redundancy to the transceiver 195 of the panel 110, 110A, and 110B. In an aspect, one of addressable PCB 1110 or PCB 1470 may include a transceiver, for example, as part of IF's 200 or 300, or simply an additional transceiver included in wireless interface 1200 that is coupled to a processor 2341 of the PCB 1470 (as shown here) or the addressable PCB 1110.

In an aspect, the expansion module 1201 may include redundant sensor circuitry with respect to the remote device 120 and/or detectable module 450. For example, in an aspect, a heat or other type (e.g., smoke) sensor 3221 may be operatively coupled to addressable PCB 1110 (e.g., to PCB 1470) and power supply 3231.

In an aspect, addressable PCB 1110 includes switches 1450 to set an address via microcontroller 1471. Other functionality such as communications and/or protocol translations may be handled separately by processor 2341 of PCB 1470.

In an aspect, processor 2341 is configured, along with wireless interface 1211, to provide multicast messages to other expansion modules to provide a notification or other type (detection) signal. In this way, if the case of panel failure, an expansion module 1201 can take over to send a signal to other remote expansion modules of other remote devices regarding providing an alarm or other indication or effect.

In an aspect, power supply 3231 is configured to supply power to all on-board elements of the expansion module. In an aspect, power supply 3231 is configured to supply power to all on-board elements of the expansion module 1201 and all elements of the remote device 120 and/or notification devices 450. In this way, stand-alone power may be provided from the power supply 3231 of the expansion module 1201 to one or more elements of the expansion module 1201 and/or a speaker 451 or strobe 452 or other element of the remote device 120 should the panel power supply fail and/or otherwise become disconnected.

In an aspect, expansion module 1201 may include a projection device 3266 (e.g., a controllable diode array) configured to display a notification and/or detection status. In an aspect, processor 2341 controls the projection device 3266. The notification can be in the status of a flashing light and/or text and/or an image. Control of the notification can be under the processor 2341 and/or the panel 110, 110A, 110B. Such notification can be useful should the housing of the remote device 120 not yet include any notification devices 450 to provide such notification or in the event of a failure of any of the notification devices 450 installed in the remote device 120.

Referring to FIG. 13, an example remote device 120 including a slot/aperture for an addressable PCB is shown, in accordance with an exemplary aspect. Such a configuration is desirable in that it avoids the use of an expansion module 1201 and minimizes the cost of the interface plate 400, 1100, 1200 by integrating the addressable PCM 1110 directly into the remote device 120.

An interface plate 1300 interfaces with a junction box 490 and the remote device 120.

In an aspect, power to the interface plate 1300 may be provided by power wire 481 and ground wire 482 of the junction box 490.

In an aspect, the interface plate 1100 has one or more connectors 1101 configured to interface with one or more connectors 1122 of a non-addressable PCB 1120 of a remote device 120. In an aspect, a connector 1101 may be spring contact, and a mating connector 1122 may be a metallic or other conductive surface. Any type of connectors may be used to connect the interface plate 1100 to the non-addressable PCB 1120.

In an aspect, the remote device 120 has a receiving slot or aperture (hereinafter "receiving slot") 1390A configured to receive an addressable PCB 1110 using a snap-in housing 1390. In an aspect, a protrusion 1390B on the snap-in housing 1390 is configured to snap into a similar shaped recess 1390C on the non-addressable OCB 1120 to secure the addressable PCB 1110 in electrical contact with the non-addressable PCB 1120. Gently pulling the addressable PCB 1110 away from the non-addressable PCB 1120 while also gently pulling downward will result in the protrusion 1390B disengaging from the similar shaped recess 1390C thus disengaging the snap-in housing 1390 from the non-addressable PCB 1120 of the remote device 120. The snap-in housing 1390 is configured (shaped) to secure the addressable PCB 1110 in a desired position for mating with the non-addressable PCB 1120 when the snap-in housing 1390 is snapped into position.

In an aspect, the non-addressable PCB 1120 includes one or more connectors 1122 configured to connect interface with one or more connectors 1112 of the addressable PCB 1110.

Figure 14:
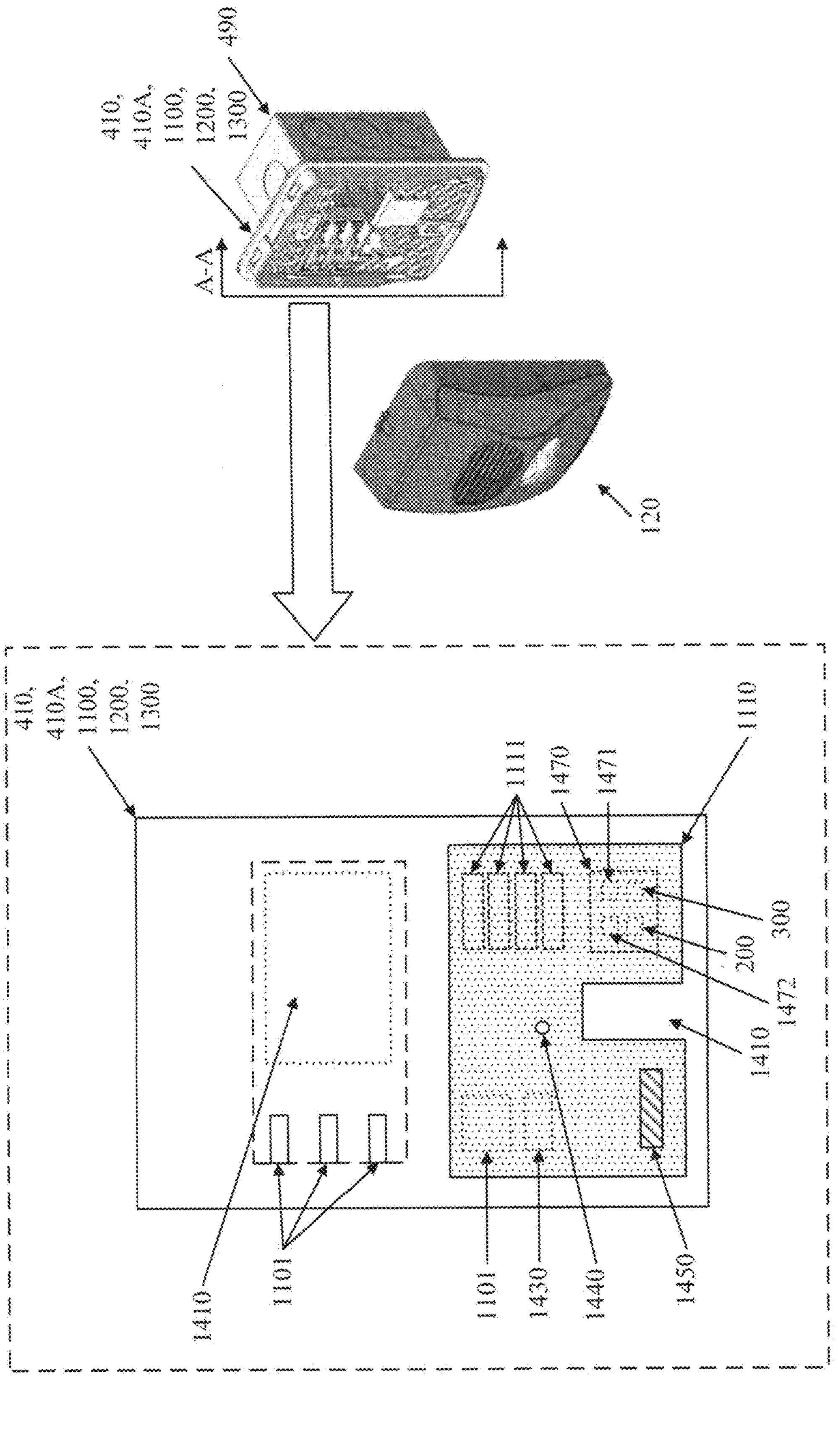
FIG. 14 is an exploded perspective view of an example addressable PCB and interface plate mounted with a remote device to a junction box, and further including an inset front view of the example addressable PCB and interface plate, in accordance with an exemplary aspect.

Referring to FIG. 14, an example addressable PCB 1110 and interface plate 410, 1100, 1200, 1300 are shown, in accordance with an exemplary aspect.

Referring to FIG. 15, a side view of interface plate 400, 1100, 1200 and a view of interface plate 400, 1100, 1200 along line A-A is further shown, in accordance with an exemplary aspect.

The interface plate 410, 1100, 1200, 1300 can be any of the interface plates from FIGS. 4, 11, 12, and 13. The addressable PCB 1110 and/or the interface plate 410, 1100, 1200, 1300 can include elements of configurations 3000 and 3100 described above with respect to FIGS. 30 and 31.

The interface plate 410, 1100, 1200, 1300 includes one or more field wires access areas 1410 configured to provide access to wires 481 and 482 in the junction box 490.

The interface plate 410, 1100, 1200, 1300 includes spring contacts (or other connector types) 1101 configured to interface with one or more connectors 1122, 1120 (e.g., a metallic or other conductive plate) of the non-addressable PCB 1110.

The addressable PCB 1110 includes a photodiode 1440 aligned with a light pipe 1177 configured to aid in self-testing of the addressable PCB 1110. The light pipe has at least two functions as follows:

1. First function: status indication (device live or Faulty)—keeps blinking intermittently to show status to floor.
2. Second function: when strobe functions, carries light from Strobe, to Photo diode sitting on PCB & Thus, gives feedback to device about strobe's functioning.

The addressable PCB 1110 includes a sound sensing piezo element 1430 configured to sense ambient sound.

The addressable PCB 1110 includes contacts 1111 which may be spring or any other type of contact or other type of connector.

The addressable PCB 1110 includes a DIP switch 1450 or other mechanical device for assigning an address.

The addressable PCB 1110 includes printed circuit board (PCB) 1470.

In an aspect, the PCB 1470 includes a microcontroller 1471. In an aspect, the microcontroller 1471 is configured to receive an address from dip switch 1450.

In an aspect, the PCB 1470 includes hardware I/O interface (IF) 200 or wireless hardware I/O IF 300. In an aspect, the PCB includes a translation processor 230 that is configured to convert any number of device protocols from a remote device 120 into device protocols processable by the FACP 110. The PCB 1470 may further include one or more other elements of the hardware I/O interface (IF) 200, 300 as shown in FIGS. 2 and 3, such as the first device protocol portion 210, the second device protocol portion 220, the power supply 290, the serial interface 291, the hardware interface 292, the wireless interface 331, and the serial debug interface 277 as described hereinabove.

In an aspect, the PCB 1470 includes a memory 1472 for storing at least an address. In an aspect, the non-addressable PCB 1120 includes a memory 1123 for storing the address stored in memory 1472.

Referring to FIG. 15, the interface plate 400, 1100 and/or expansion module 1201 may include a snap-in housing 1490 to encapsulate and/or retain at least part of the addressable PCB 1110. Snap-in housing 1490 differs from snap-in housing 1390 in that snap-in housing 1490 is configured to couple the addressable PCB 1110 to any of interface plate 400, 1100, and/or expansion module 1201, while the snap-in housing 1390 is configured to couple the addressable PCB to only interface plate 1300. Snap-in housing 1490 includes a first part 1490A that fits in a corresponding recess 1490C of the interface plate 400, 1100 and/or expansion module 1201 and a second part 1490B that pressure fits against a sidewall of the interface plate 400, 1100 and/or expansion module 1201. It is to be appreciated that the preceding housings and their connections are merely illustrative and may be substituted for other housings and connections that also enable an addressable PCB 1110 to be operatively coupled to a non-addressable PCB 1120 of a remote device 120. For example, any retaining shape, formed of a preferably non-conductive material, may be used to secure the addressable PCB with any connector including springs, pressure, protrusions and receiving portions, fasteners, and so forth to couple the addressable PCB 1110 to the non-addressable PCB 1120.

In an aspect, addressable PCB 1110 includes contacts 1111 that pass through the snap-in housing 1490 and are configured to mate with contact pads 1121 on the non-addressable PCB 1120.

In an aspect, the DIP switch 1450 may at least partially protrude through the snap-in housing 1490 to enable a user to set an address that is processed and recorded by the PCB 1470 such as by microcontroller 1470.

Figure 26:
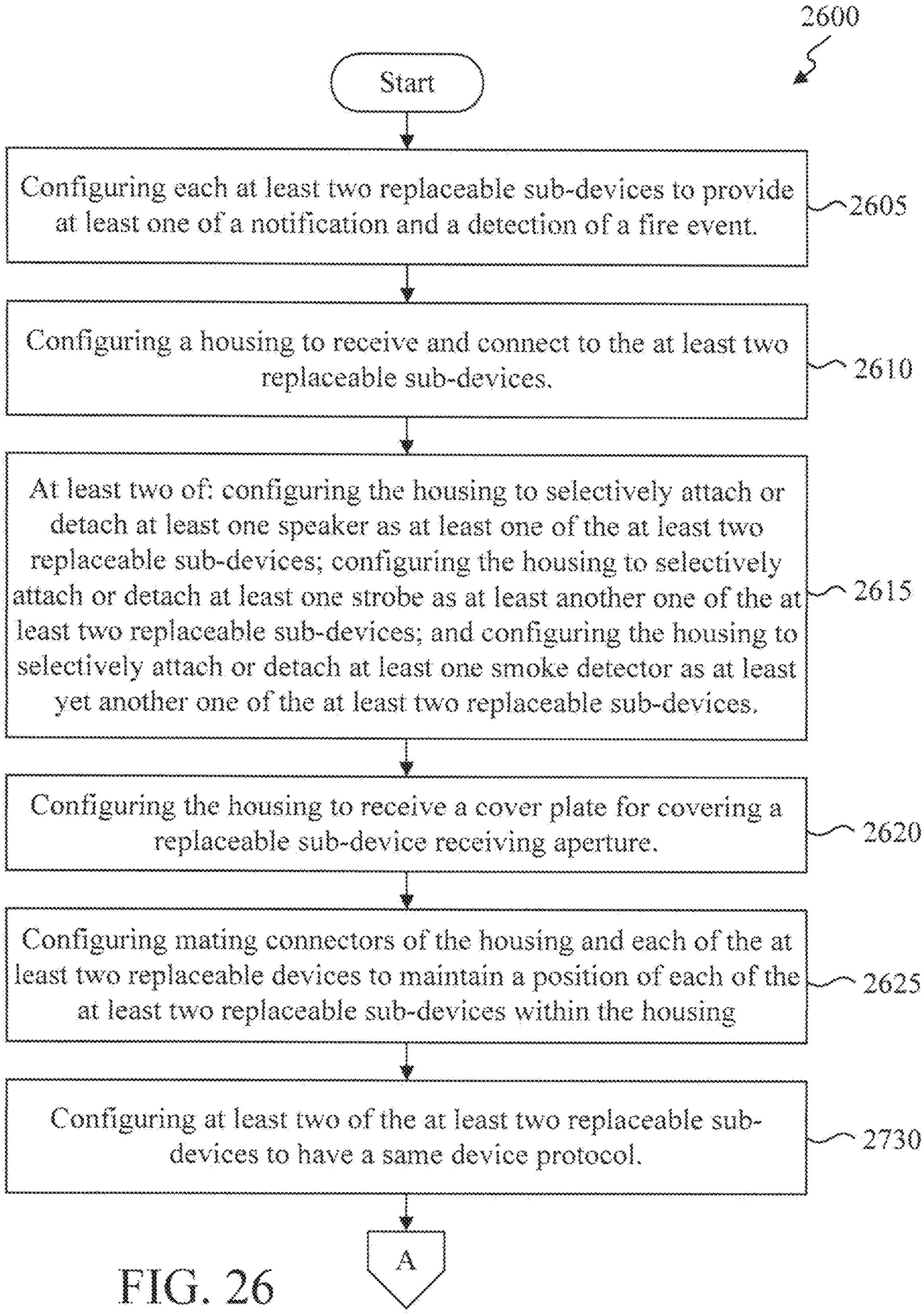
FIGS. 26-29 is a flow diagram of an example method for providing a remote device for a fire alarm control system, in accordance with an exemplary aspect.
Figure 27:
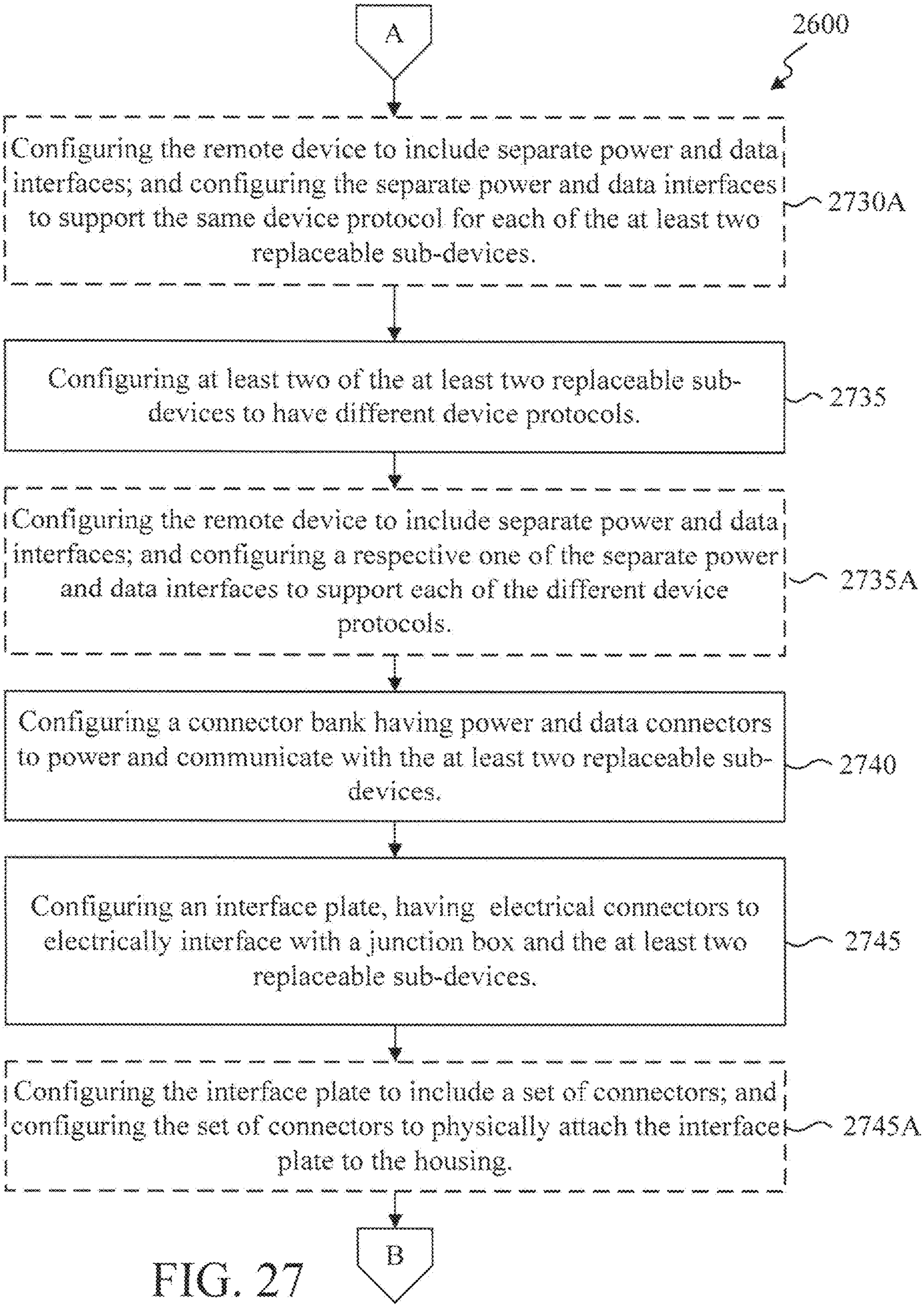
Figure 28:
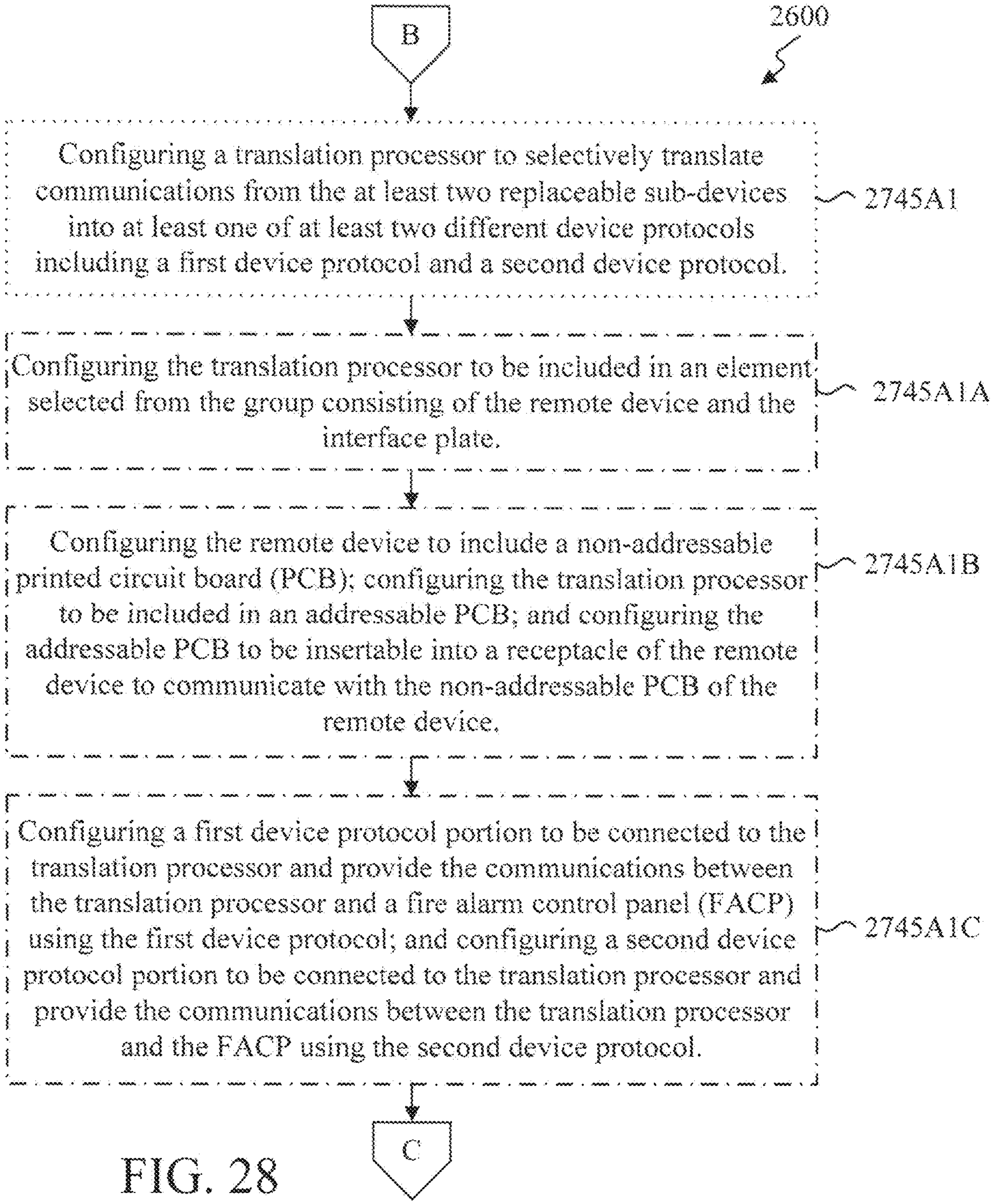
Figure 29:
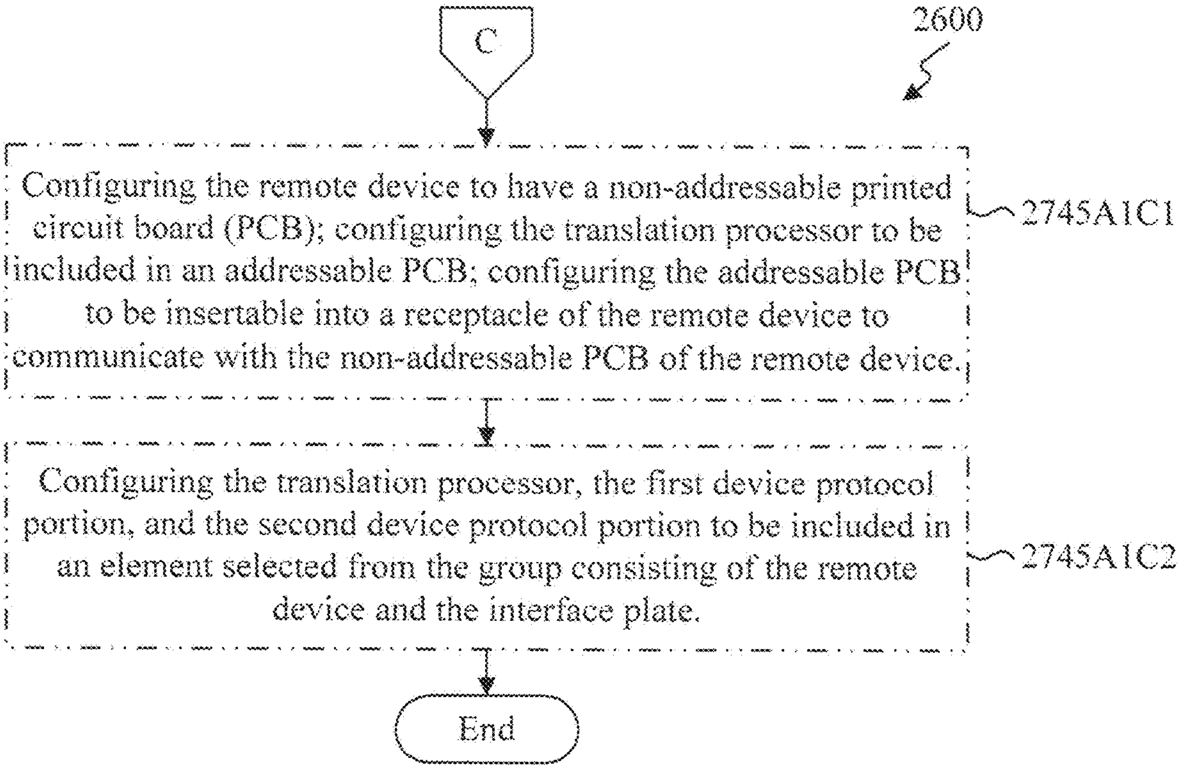

Referring now to FIGS. 16-18, a first method 1600 is shown, while a second method 1900 is shown in FIGS. 19-25, and a third method 2600 is shown in FIGS. 26-28. It is to be appreciated that these methods may be readily combined and elements and/or blocks interchanged, subtracted, and/or added to arrive at a multitude of embodiments as set forth by the numbering the flowcharts of the three methods. In particular, the following numbering used to describe the flowchart blocks of each method add another character for a sub-block. For example, block 510A is a sub-block of block 510, while block 510A1 is a sub-block of sub-block 510A, and so forth. In this way, different combinations are described combining different elements of the various elements and/or blocks.

Referring now to FIGS. 16-18, a method 1600 for coupling a remote device 120 to a fire alarm control panel (FACP) 110 is shown, in accordance with an exemplary aspect. Boxes shown in dashes or dashes and dots are optional features. Method 1600 may be performed by one or more processors (e.g., processor(s) 192 of FIG. 1) operatively coupled to one or more memories (e.g., memory(s) 191 of FIG. 1). The method 1600 may be implemented, in part, by computer code (e.g., computer code in memory(s) 191 of FIG. 1).

At block 1605, the method 1600 includes configuring a translation processor 230 to selectively translate communications from the remote device 120 into at least one of at least two different device protocols including a first device protocol and a second device protocol.

In an aspect, block 1605 may include block 1605A.

At block 1605A, the method includes configuring the at least two different device protocols to include at least two different data and electrical (power) protocols.

At block 1610, the method 1600 includes configuring a first device protocol portion 210 connected to the translation processor to provide the communications between the translation processor 230 and the FACP 110 using the first device protocol.

In an aspect, block 1610 may include block 1610A.

At block 1610A, the method 1600 includes configuring the first device protocol portion 210 to include a first device protocol loop interface (IF) 211 connected to a first device protocol receiver IF 212 and a first device protocol transmitter IF 213.

In an aspect, block 1610A may include block 1610A1.

At block 1610A1, the method 1600 includes connecting the translation processor 230 to the first device protocol receiver IF 212 and the first device protocol transmitter IF 213.

At block 1610A2, the method 1600 includes configuring the first device protocol loop IF 211 to be connectable to a first device protocol loop 291 of the FACP 110.

At block 1610A3, the method 1600 includes configuring the first device protocol receiver IF 212 and the first device protocol transmitter IF 213 to respectively receive and transmit signals in accordance with the first device protocol.

At block 1615, the method 1600 includes configuring a second device protocol portion 220 connected to the translation processor 230 to provide the communications between the translation processor 230 and the FACP 110 using the second device protocol.

In an aspect, block 1615 may include block 1615A.

At block 1615A, the method 1600 includes configuring the second device protocol portion 220 to include a second device protocol loop IF 221 connected to a second device protocol receiver IF 222 and a second device protocol transmitter IF 223.

In an aspect, block 1615A may include one or more of blocks 1615A1 through 1615A3.

At block 1615A1, the method 1600 includes connecting the translation processor 230 to the first device protocol receiver IF 212, the first device protocol transmitter IF 213, the second device protocol receiver IF 222, and the second device protocol transmitter IF 223.

At block 1615A2, the method 1600 includes configuring the second device protocol loop IF 221 to be connectable to a second device protocol loop 292 of the FACP 110.

At block 1615A3, the method 1600 includes configuring the second device protocol receiver IF 222 and the second device protocol transmitter IF 223 to respectively receive and transmit signals in accordance with the second device protocol.

At block 1620, the method 1600 includes configuring a serial IF 241 and a hardware Input/Output IF 242 connected to the translation processor 230 to interface the translation processor with the remote device 120.

At block 1625, the method includes 1600 configuring a wireless IF 331 connected to the translation processor 230 to wirelessly interface the translation processor 230 with a wireless IF 381 of the remote device 120.

At block 1630, the method 1600 includes configuring a serial debug IF 277 to electrically interface the translation processor 230 to a remote computer.

At block 1635, the method 1600 includes configuring an IF plate 410, 1100, 1200, 1300 to interface a junction box 490 to the remote device 120.

In an aspect, block 1635 may include block 1635A.

At block 1635A, the method 1600 includes configuring the IF plate 410, 1100, 1200, 1300 to include the translation processor 230, the first device protocol portion 210, and the second device protocol portion 220.

At block 1640, the method 1600 includes configuring the translation processor 230 to communicate with at least two separate sub-devices 451, 452 comprised in the remote device 120. The sub-devices 451, 452 are configured to at least one of detect and report a potential fire condition.

At block 1650, the method 1600 includes configuring the FACP 110A to process communications in the second device protocol initially provided by a first device protocol device 291A configured to output communications in the first device protocol, configuring the translation processor 230, the first device protocol portion 210, and second device protocol portion 220 to form a communication path between the FACP 110A and the first device protocol device 291A, and configuring communications in the first device protocol output by the first device protocol device 291A to be processed by the first device protocol portion 210 and translated into communications in the second device protocol by the translation processor 230 that are processed by the second device portion 220 and provided to the FACP 110A.

At block 1660, the method 1600 includes configuring the FACP 110B to process communications in the first device protocol initially provided by a second device protocol device 291B configured to output communications in the second device protocol, configuring the translation processor 230, the first device protocol portion 210, and second device protocol portion 220 form a communication path between the FACP 110B and the second device protocol device 291B, and configuring communications in the second device protocol output by the second device protocol device 291B to be processed by the second device protocol portion 220 and translated into communications in the first device protocol by the translation processor 230 that are processed by the first device portion 210 and provided to the FACP 110B.

Referring now to FIGS. 19-25, a method 1900 for coupling a remote device 120 to a fire alarm control panel (FACP) 110 is shown, in accordance with an exemplary aspect. Boxes shown in dashes or dashes and dots are optional features. Method 1900 may be performed by one or more processors (e.g., processor(s) 192 of FIG. 1) operatively coupled to one or more memories (e.g., memory(s) 191 of FIG. 1). The method 1900 may be implemented, in part, by computer code (e.g., computer code in memory(s) 191 of FIG. 1).

At block 1905, the method 1900 includes configuring an addressable printed circuit board (PCB) 1110 to electrically connect and assign an address of the addressable PCB 1110 to a non-addressable PCB 1120 of a remote device 120.

In an aspect, block 1905 may include one or more of blocks 1905A and 1905B.

At block 1905A, the method 190 includes configuring the address to be dynamically assignable by the addressable PCB 1110 based on user settings.

At block 1905B, the method includes configuring the addressable PCB 1110 to include switches for manually setting an address by a user.

At block 1910, the method 1900 includes configuring a housing 410, 1100, 1201, 1390 to retain at least a portion of the addressable PCB 1110 and to physically connect to a receiving device.

At block 1915, the method 1900 includes configuring the remote device 120 to include at least one of a fire notification device and a fire detection device.

At block 1920, the method 1900 includes configuring the remote device 120 to include multiple sub-devices 451, 452 that, in turn, include, two or more of: one or more fire notification devices; and one or more fire detection devices.

At block 1925, the method 1900 includes configuring the apparatus to include a light pipe 1177 that, in turn, is configured to receive light. The addressable PCB 1110 is configured to perform a self-test based on the light received through the light pipe 1177.

At block 1930, the method 1900 includes configuring fire alarm control panel (FACP) 110 wiring to be connected to the non-addressable PCB 1120.

Interface Plate

At block 1935, the method 1900 includes configuring the receiving device as an interface plate 410, 1100, 1200, 1300 that is, in turn, configured to couple a junction 490 box to the remote device 120 including the non-addressable PCB 1120.

In an aspect, block 1935 may include block 1935A.

At block 1935A, method 1900 includes configuring the interface plate 410, 1100 to include a backside configured to connect to the junction box and a frontside configured to receive the addressable PCB 1110 having the address and electrically connect the addressable PCB 1110 to the non-addressable PCB 1120 of the remote device 120 to assign the address of the addressable PCB 1110 to the non-addressable PCB 1120 of the remote device 120.

At block 1940, the method 1900 further includes configuring the apparatus and the remote device 120 to include respective memories such that the memory 1472 of the apparatus and the memory 1123 of the remote device 120 store the address to provide redundancy.

In an aspect, block 1940 may include block 1940A.

At block 1940A, the method 1900 includes configuring the memory 1472 of the apparatus to be included in the addressable PCB 1110 or an interface plate 410, 1100, 1200, 1300 configured to interface with a junction box 490.

At block 1945, the method 1900 includes configuring the apparatus to include a translation processor 230 that, in turn, is configured to selectively translate communications from the non-addressable PCB 1120 of the remote device 120 into at least one of at least two different device protocols including a first device protocol and a second device protocol.

In an aspect, block 1945 may include one or more of blocks 1945A through 1945C.

At block 1945A, the method 1900 includes configuring the translation processor 230 to be included in the addressable PCB 1110 or the interface plate 410, 1100, 1200, 1300.

At block 1945B, the method 1900 incudes configuring a first device protocol portion 210 connected to the translation processor 230 to provide the communications between the addressable PCB 1110 of the translation processor 230 and a fire alarm control panel (FACP) 110 using the first device protocol, and configuring a second device protocol portion 220 connected to the translation processor 230 to provide the communications between the addressable PCB of the translation processor and the FACP 110 using the second device protocol.

In an aspect, block 1945B may include block 1945B1.

At block 1945B1, the method 1900 includes configuring the translation processor 230, the first device protocol portion 210, and the second device protocol portion 220 to be comprised in at least one of the addressable PCB 1110 and the interface plate 400, 1100, 1200, 1300.

At block 1945C, the method 1900 includes configuring the remote device 120 to include multiple sub-devices 451, 452 that, in turn, include two or more of: one or more fire notification devices and one or more fire detection devices, and configuring the translation processor 230 to selectively translate communications received from each of the multiple sub-devices 451, 452 into at least one of the at least two different device protocols.

Expansion Module

At block 1950, the method 1900 includes configuring the receiving device as an expansion module 1201 having the addressable PCB 1110 integrated therein and able to be connected between a junction box 490 and the remote device 120 that includes the non-addressable PCB 1120.

In an aspect, block 1950 may include one or more of blocks 1950A through 1950C.

At block 1950A, the method 1900 includes configuring the expansion module 1201 to include a backside configured to connect to the junction box 490 and a front side configured to connect the addressable PCB 1110 of the expansion module 1201 to the non-addressable PCB 1120 of the remote device 120 to assign the address of the addressable PCB 1110 of the expansion module 1201 to the non-addressable PCB 1120 of the remote device 120.

At block 1950B, the method 1900 includes configuring the apparatus to include a memory 1472 and the remote device 120 to include a memory 1123, and configuring both the memory 1472 of the apparatus and the memory 1123 of the remote device 120 to store the address to provide redundancy.

In an aspect, block 1950B may include block 1950B1.

At block 1950B1, the method 1900 includes configuring the memory 1470 of the apparatus to be included in the addressable PCB or the expansion module.

At block 1950C, the method 1900 includes configuring a translation processor 230 to selectively translate communications from the non-addressable PCB 1120 of the remote device 120 into at least one of at least two different device protocols including a first device protocol and a second device protocol.

In an aspect, block 1950C may include one or more of blocks 1950C1 through 1950C4. While not shown with respect to the interface plate or remote device for the sake of brevity, blocks 1950C3-C4 may also be performed with respect to any of the interface plate, the remote device, and the expansion module.

At block 1950C1, the method 1900 includes configuring the translation processor 230 to be included in the addressable PCB 1110 or the expansion module 1201.

In an aspect, block 1950C1 may include block 1950C1A.

At block 1950C1A, the method 1900 includes configuring the apparatus to include: a first device protocol portion 210 connected to the translation processor 230 and configured to provide the communications between the addressable PCB 1110 of the translation processor 230 and a fire alarm control panel (FACP) 110 using the first device protocol; and a second device protocol portion 220 connected to the translation processor 230 and configured to provide the communications between the addressable PCB 1110 of the translation processor 230 and the FACP 110 using the second device protocol.

In an aspect, block 1950C1A may include block 1950C1A1.

At block 1950C1A1, the method 1900 includes configuring the translation processor 230, the first device protocol portion 210, and the second device protocol portion 220 to be included in at least one the addressable PCB 1110 and the expansion module 1201.

At block 1950C2, the method 1900 includes configuring the remote device 120 to include multiple sub-devices 451, 452 that, in turn, include two or more of: one or more fire notification devices; and one or more fire detection devices, and configuring the translation processor 230 to selectively translate communications received from each of the multiple sub-devices 451, 452 into at least one of at least two different device protocols.

At block 1950C3, the method 1900 includes configuring the translation processor to selectively translate communications between a first device protocol device 291A configured to output communication in the first device protocol and a second device protocol panel 110A configured to process communications in the second device protocol. In another aspect, block 1950C3 may also depend from block 1950C1A in including a first device protocol portion 210 and a second device protocol portion 220 that are both used in a communication path that includes the translation processor 230 and that is in between the first device protocol device 291A and the second device protocol panel 1110A.

At block 1950C4, the method 1900 includes configuring the translation processor to selectively translate communications between a second device protocol device 291B configured to output communication in the second device protocol and a first device protocol panel 110B configured to process communications in the first device protocol. In another aspect, block 1950C4 may also depend from block 1950C1A in including a first device protocol portion 210 and a second device protocol portion 220 that are both used in a communication path that includes the translation processor 230 and that is in between the second device protocol device 291B and the first device protocol panel 1110B.

At block 1950D, the method 1900 includes configuring an expansion module on-board power supply 3231 to power the expansion module 1201 and the remote device 120.

At block 1950E, the method 1900 includes configuring an expansion module on-board sensor (e.g., a heat sensor) 3221 to provide redundant (same) or supplemental (different) sensing for the remote device. Heat sensors, $CO_2$ sensors, smoke sensors, and so forth may be used as redundant (the same as already on remote device 120) or supplemental (different than what is already installed on remote device 120).

At block 1950F, the method 1900 includes configuring an expansion module on-board wireless interface 3211 to provide wireless communications between the remote device 120 and an element of a communication path between the remote device 120 and another device (e.g., the panel 110, 110A, 110B and/or the interface plate 1200).

Remote Device

At block 1955, the method 1900 includes configuring the receiving device as the remote device 120.

In an aspect, block 1955 may include one or more of blocks 1955A through 1955B.

At block 1955A, the method 1900 includes configuring the housing 410, 1100, 1201, 1390 to include an aperture that, in turn, is configured to receive the addressable PCB 1110 at least partially retained within the portion of the housing 410, 1100, 1201, 1390 and connect the addressable PCB 1110 to the non-addressable PCB 1120 comprised in the remote device 120.

At block 1955B, the method 1900 includes configuring the apparatus to include a translation processor 230 that, in turn, is configured to selectively translate communications from the non-addressable PCB 1120 of the remote device 120 into at least one of at least two different device protocols including a first device protocol and a second device protocol.

In an aspect, block 1955B may include one or more of blocks 1955B1 through 1955B3.

At block 1955B1, the method 1900 includes configuring the translation processor 230 to be included in the addressable PCB 1110.

At block 1955B2, the method 1900 incudes configuring the apparatus to include a first device protocol portion 210 connected to the translation processor 230 and configured to provide the communications between the addressable PCB 1110 of the translation processor 230 and a fire alarm control panel (FACP) 110 using the first device protocol, and a second device protocol portion 220 connected to the translation processor 230 and configured to provide the communications between the addressable PCB 1110 of the translation processor 230 and the FACP 110 using the second device protocol.

In an aspect, block 1955B2 may include block 1955B2A.

At block 1955B2A, the method 1900 includes configuring the translation processor 230, the first device protocol portion 210, and the second device protocol portion 220 to be included in the addressable PCB 1110.

At block 1955B3, the method includes configuring the remote device 120 to include multiple sub-devices 451, 452 that, in turn, include two or more items of: one or more fire notification devices; and one or more fire detection devices, and configuring the translation processor 230 to selectively translate communications received from each of the multiple sub-devices 451, 452 into at least one of the at least two different device protocols.

Referring now to FIGS. 26-29, a method for providing a remote device for a fire alarm control system 2600 is shown, in accordance with an exemplary aspect. Boxes shown in dashes or dashes and dots are optional features. Method 2600 may be performed by one or more processors (e.g., processor(s) 192 of FIG. 1) operatively coupled to one or more memories (e.g., memory(s) 191 of FIG. 1). The method 2600 may be implemented, in part, by computer code (e.g., computer code in memory(s) 191 of FIG. 1)

At block 2605, the method 2600 includes configuring each at least two replaceable sub-devices 451, 452 to provide at least one of a notification and a detection of a fire event.

At block 2610, the method 2600 includes configuring a housing 121 to receive and connect to the at least two replaceable sub-devices 451, 452.

At block 2615, the method 2600 includes at least two of: configuring the housing 121 to selectively attach or detach at least one speaker 452 as at least one of the at least two replaceable sub-devices; configuring the housing to selectively attach or detach at least one strobe 451 as at least another one of the at least two replaceable sub-devices; and configuring the housing 121 to selectively attach or detach at least one smoke detector as at least yet another one of the at least two replaceable sub-devices.

At block 2620, the method 2600 includes configuring the housing 121 to receive a cover plate 459 for covering a replaceable sub-device receiving aperture.

At block 2625, the method 2600 includes configuring mating connectors 231, 232 of the housing 121 and each of the at least two replaceable devices 451, 452 to maintain a position of each of the at least two replaceable sub-devices 451, 452 within the housing 121.

At block 2730, the method 2600 includes configuring at least two of the at least two replaceable sub-devices 451, 452 to have a same device protocol.

In an aspect, block 2730 may include block 2730A.

At block 2730A, the method 2600 includes configuring the remote device 120 to include separate power 431, 432, 441, 442 and data interfaces 433, 443; and configuring the separate power 431, 432, 441, 442 and data interfaces 433, 443 to support the same device protocol for each of the at least two replaceable sub-devices 451, 452.

At block 2735, the method 2600 includes configuring at least two of the at least two replaceable sub-devices 451, 452 to have different device protocols.

In an aspect, block 2735 may include block 2735A.

At block 2735A, the method 2600 includes configuring the remote device 120 to include separate power 431, 432, 441, 442 and data interfaces 433, 443; and configuring a respective one of the separate power 431, 432, 441, 442 and data interfaces to support each of the different device protocols 433, 443.

At block 2740, the method 2600 includes configuring a connector bank 430, 440 having power 431, 432, 441, 442 and data connectors 433, 443 to power and communicate with the at least two replaceable sub-devices.

At block 2745, the method 2600 includes configuring an interface plate 410, having electrical connectors 430, 440 to electrically interface with a junction box 490 and the at least two replaceable sub-devices 451, 452.

In an aspect, block 2745 may include block 2745A.

At block 2745A, the method 2600 includes configuring the interface plate 410 to include a set of connectors 231, 232; and configuring the set of connectors to physically attach the interface plate to the housing 121.

In an aspect, block 2745A may include block 2745A1

At block 2745A1, the method includes configuring a translation processor 230 to selectively translate communications from the at least two replaceable sub-devices 451, 452 into at least one of at least two different device protocols including a first device protocol and a second device protocol.

In an aspect, block 2745A1 may include one or more of blocks 2745A1A through 2745A1C.

At block 2745A1A, the method 2600 includes configuring the translation processor 230 to be included in an element selected from the group consisting of the remote device 120 and the interface plate 410.

At block 2745A1B, the method 2600 includes configuring the remote device 120 to include a non-addressable printed circuit board (PCB) 1120; configuring the translation processor 230 to be included in an addressable PCB 1110; and configuring the addressable PCB 1110 to be insertable into a receptacle of the remote device 120 to communicate with the non-addressable PCB 1120 of the remote device 120.

At block 2745A1C, the method 2600 includes configuring a first device protocol portion 210 to be connected to the translation processor 230 and provide the communications between the translation processor 230 and a fire alarm control panel (FACP) 110 using the first device protocol; and configuring a second device protocol portion 220 to be connected to the translation processor 230 and provide the communications between the translation processor 230 and the FACP 110 using the second device protocol.

In an aspect, block 2745A1C may include one or more of blocks 2745A1C1 through 2745A1C2.

At block 2745A1C1, the method 2600 includes configuring the remote device 120 to have a non-addressable printed circuit board (PCB) 1120; configuring the translation processor 230 to be included in an addressable PCB 1110; configuring the addressable PCB 1110 to be insertable into a receptacle of the remote device 120 to communicate with the non-addressable PCB 1120 of the remote device 120.

At block 2745A1C2, the method 2600 includes configuring the translation processor 230, the first device protocol portion 210, and the second device protocol portion 220 to be included in an element selected from the group consisting of the remote device 120 and the interface plate 410.

Clause 1. A remote device for a fire alarm control system, the remote device comprising: at least two replaceable sub-devices, each configured to provide at least one of a notification and a detection of a fire event; and a housing configured to receive and connect to the at least two replaceable sub-devices.

Clause 2. The remote device in accordance with clause 1, wherein the at least two replaceable sub-devices are selected as item from the group consisting of a speaker, a strobe, and a smoke detector.

Clause 3. The remote device in accordance with any preceding clauses, wherein the housing is further configured to receive a cover plate for covering a replaceable sub-device receiving aperture.

Clause 4. The remote device in accordance with any preceding clauses, wherein the housing and each of the at least two replaceable devices having mating connectors for mating to maintain a position of each of the at least two replaceable sub-devices within the housing.

Clause 5. The remote device in accordance with any preceding clauses, wherein at least two of the at least two replaceable sub-devices have a same device protocol.

Clause 6. The remote device in accordance with any preceding clauses, wherein the remote device further comprises separate power and data interfaces for supporting a same device protocol for each of the at least two replaceable sub-devices.

Clause 7. The remote device in accordance with any preceding clauses, wherein at least two of the at least two replaceable sub-devices have different device protocols.

Clause 8. The remote device in accordance with any preceding clauses, wherein the remote device further comprises separate power and data interfaces for supporting each of the different device protocols.

Clause 9. The remote device in accordance with any preceding clauses, further comprising a connector bank having power and data connectors configured to power and communicate with the at least two replaceable sub-devices.

Clause 10. The remote device in accordance with any preceding clauses, further comprising an interface plate having electrical connectors configured to electrically interface with a junction box and the at least two replaceable sub-devices.

Clause 11. The remote device in accordance with any preceding clauses, wherein the interface plate further comprises a set of connectors configured to physically attach the interface plate to the housing.

Clause 12. The remote device in accordance with any preceding clauses, further comprising: a translation processor configured to selectively translate communications from the at least two replaceable sub-devices into at least one of at least two different device protocols including a first device protocol and a second device protocol.

Clause 13. The remote device in accordance with any preceding clauses, wherein the translation processor is comprised in an element selected from the group consisting of the remote device and the interface plate.

Clause 14. The remote device in accordance with any preceding clauses, wherein the remote device has a non-addressable printed circuit board (PCB), and wherein the translation processor is comprised in an addressable PCB configured to be insertable into a receptacle of the remote device to communicate with the non-addressable PCB of the remote device.

Clause 15. The remote device in accordance with any preceding clauses, further comprising: a first device protocol portion connected to the translation processor and configured to provide the communications between the translation processor and a fire alarm control panel (FACP) using the first device protocol; and a second device protocol portion connected to the translation processor and configured to provide the communications between the translation processor and the FACP using the second device protocol.

Clause 16. The remote device in accordance with any preceding clauses, wherein the remote device has a non-addressable printed circuit board (PCB), wherein the translation processor is comprised in an addressable PCB configured to be insertable into a receptacle of the remote device to communicate with the non-addressable PCB of the remote device.

Clause 17. The remote device in accordance with any preceding clauses, and wherein the translation processor, the first device protocol portion, and the second device protocol portion are comprised in an element selected from the group consisting of the remote device and the interface plate.

Clause 18. A method for providing a remote device for a fire alarm control system, the method comprising: configuring each at least two replaceable sub-devices to provide at least one of a notification and a detection of a fire event; and configuring a housing to receive and connect to the at least two replaceable sub-devices.

Clause 19. The method in accordance with clause 18, further comprising at least two of: configuring the housing to selectively attach or detach at least one speaker as at least one of the at least two replaceable sub-devices; configuring the housing to selectively attach or detach at least one strobe as at least another one of the at least two replaceable sub-devices; and configuring the housing to selectively attach or detach at least one smoke detector as at least yet another one of the at least two replaceable sub-devices.

Clause 20. The method in accordance with any preceding clauses, configuring the housing to receive a cover plate for covering a replaceable sub-device receiving aperture.

Clause 21. The method in accordance with any preceding clauses, further comprising configuring mating connectors of the housing and each of the at least two replaceable devices to maintain a position of each of the at least two replaceable sub-devices within the housing.

Clause 22. The method in accordance with any preceding clauses, further comprising configuring at least two of the at least two replaceable sub-devices to have a same device protocol.

Clause 23. The method in accordance with any preceding clauses, further comprising: configuring the remote device to include separate power and data interfaces; and configuring the separate power and data interfaces to support the same device protocol for each of the at least two replaceable sub-devices.

Clause 24. The method in accordance with any preceding clauses, further comprising configuring at least two of the at least two replaceable sub-devices to have different device protocols.

Clause 25. The method in accordance with any preceding clauses, further comprising: configuring the remote device to include separate power and data interfaces; and configuring a respective one of the separate power and data interfaces to support each of the different device protocols.

Clause 26. The method in accordance with any preceding clauses, further comprising configuring a connector bank having power and data connectors to power and communicate with the at least two replaceable sub-devices.

Clause 27. The method in accordance with any preceding clauses, further comprising: configuring an interface plate having electrical connectors to electrically interface with a junction box and the at least two replaceable sub-devices.

Clause 28. The method in accordance with any preceding clauses, further comprising: configuring the interface plate to include a set of connectors; and configuring the set of connectors to physically attach the interface plate to the housing.

Clause 29. The method in accordance with any preceding clauses, further comprising configuring a translation processor to selectively translate communications from the at least two replaceable sub-devices into at least one of at least two different device protocols including a first device protocol and a second device protocol.

Clause 30. The method in accordance with any preceding clauses, further comprising configuring the translation processor to be included in an element selected from the group consisting of the remote device and the interface plate.

Clause 31. The method in accordance with any preceding clauses, further comprising: configuring the remote device to include a non-addressable printed circuit board (PCB); configuring the translation processor to be included in an addressable PCB; and configuring the addressable PCB to be insertable into a receptacle of the remote device to communicate with the non-addressable PCB of the remote device.

Clause 32. The method in accordance with any preceding clauses, further comprising: configuring a first device protocol portion to be connected to the translation processor and provide the communications between the translation processor and a fire alarm control panel (FACP) using the first device protocol; and configuring a second device protocol portion to be connected to the translation processor and provide the communications between the translation processor and the FACP using the second device protocol.

Clause 33. The method in accordance with any preceding clauses, further comprising: configuring the remote device to have a non-addressable printed circuit board (PCB); configuring the translation processor to be included in an addressable PCB; configuring the addressable PCB to be insertable into a receptacle of the remote device to communicate with the non-addressable PCB of the remote device.

Clause 34. The method in accordance with any preceding clauses, further comprising configuring the translation processor, the first device protocol portion, and the second device protocol portion to be included in an element selected from the group consisting of the remote device and the interface plate.

Various aspects of the disclosure may take the form of an entirely or partially hardware aspect, an entirely or partially software aspect, or a combination of software and hardware. Furthermore, as described herein, various aspects of the disclosure (e.g., systems and methods) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit the performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor (s) functionally coupled thereto. Non-transitory storage media can include read-only memory (ROM); random access memory (RAM); magnetic disk storage media; optical storage media; flash memory, and so forth.

Aspects of this disclosure are described herein with reference to block diagrams and flowchart illustrations of methods, systems, apparatuses, and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, a special-purpose computer, or another programmable information processing apparatus to produce a particular machine, such that the operations or functions specified in the flowchart block or blocks can be implemented in response to execution at the computer or processing apparatus.

Unless otherwise expressly stated, it is in no way intended that any device protocol, procedure, process, or method set forth herein be construed as requiring that its acts or steps be performed in a specific order. Accordingly, where a process or method claim does not actually recite an order to be followed by its acts or steps, or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of aspects described in the specification or annexed drawings; or the like.

As used in this disclosure, including the annexed drawings, the terms "component," "module," "system," and the like are intended to refer to a computer-related entity or an entity related to an apparatus with one or more specific functionalities. The entity can be either hardware, a combination of hardware and software, software, or software in execution. One or more of such entities are also referred to as "functional elements." As an example, a component can be a process running on a processor, a processor, an object, an executable, a thread of execution, a program, and/or a computer. For example, both an application running on a server or network controller, and the server or network controller can be a component. One or more components can reside within a process and/or thread of execution and a component can be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which parts can be controlled or otherwise operated by program code executed by a processor. As yet another example, a component can be an apparatus that provides specific functionality through electronic components without mechanical parts, the electronic components can include a processor to execute program code that provides, at least partially, the functionality of the electronic components. As still another example, interface(s) can include I/O components or Application Programming Interface (API) components. While the foregoing examples are directed to aspects of a component, the exemplified aspects or features also apply to a system, module, and similar.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should be construed to mean "one or more" unless specified otherwise or clear from context to be directed to a singular form.

In addition, the terms "example" and "such as" and "e.g." are utilized herein to mean serving as an instance or illustration. Any aspect or design described herein as an "example" or referred to in connection with a "such as" clause or "e.g." is not necessarily to be construed as preferred or advantageous over other aspects or designs described herein. Rather, use of the terms "example" or "such as" or "e.g." is intended to present concepts in a concrete fashion. The terms "first," "second," "third," and so forth, as used in the claims and description, unless otherwise clear by context, is for clarity only and does not necessarily indicate or imply any order in time or space.

The term "processor," as utilized in this disclosure, can refer to any computing processing unit or device comprising processing circuitry that can operate on data and/or signaling. A computing processing unit or device can include, for example, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. In some cases, processors can exploit nano-scale architectures, such as molecular and quantum-dot based transistors, switches and gates, in order to optimize space usage or enhance performance of user equipment. A processor may also be implemented as a combination of computing processing units.

In addition, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. Moreover, a memory component can be removable or affixed to a functional element (e.g., device, server).

Simply as an illustration, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects described herein can be implemented as a method, apparatus, or article of manufacture using special programming as described herein. In addition, various of the aspects disclosed herein also can be implemented by means of program modules or other types of computer program instructions specially configured as described herein and stored in a memory device and executed individually or in combination by one or more processors, or other combination of hardware and software, or hardware and firmware. Such specially configured program modules or computer program instructions, as described herein, can be loaded onto a general-purpose computer, a special-purpose computer, or another type of programmable data processing apparatus to produce a machine, such that the instructions which execute on the computer or other programmable data processing apparatus create a means for implementing the functionality of disclosed herein.

The term "article of manufacture" as used herein is intended to encompass a computer program accessible from any non-transitory computer-readable device, carrier, or media. For example, computer readable media can include but are not limited to magnetic storage devices (e.g., hard drive disk, floppy disk, magnetic strips, or similar), optical discs (e.g., compact disc (CD), digital versatile disc (DVD), blu-ray disc (BD), or similar), smart cards, and flash memory devices (e.g., card, stick, key drive, or similar).

The detailed description set forth herein in connection with the annexed figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well-known components are shown in block diagram form, while some blocks may be representative of one or more well-known components.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A remote device for a fire alarm control system, the remote device comprising:
- at least two replaceable sub-devices, each configured to provide at least one of a notification and a detection of a fire event;
- a housing comprising a single enclosure configured to receive and connect to the at least two replaceable sub-devices within the housing; and
- a translation processor configured to selectively translate communications from the at least two replaceable sub-devices into at least one of at least two different device protocols including a first device protocol and a second device protocol.

2. The remote device in accordance with claim 1, wherein the at least two replaceable sub-devices are selected from the group consisting of a speaker, a strobe, and a smoke detector.

3. The remote device in accordance with claim 1, wherein the housing is further configured to receive a cover plate for covering a replaceable sub-device receiving aperture.

4. The remote device in accordance with claim 1, wherein the housing and each of the at least two replaceable sub-devices having mating connectors for mating to maintain a position of each of the at least two replaceable sub-devices within the housing.

5. The remote device in accordance with claim 1, wherein at least two of the at least two replaceable sub-devices have a same device protocol.

6. The remote device in accordance with claim 1, wherein the remote device further comprises separate power and data interfaces for supporting a same device protocol for each of the at least two replaceable sub-devices.

7. The remote device in accordance with claim 1, wherein at least two of the at least two replaceable sub-devices have different device protocols.

8. The remote device in accordance with claim 7, wherein the remote device further comprises separate power and data interfaces for supporting each of the different device protocols.

9. The remote device in accordance with claim 1, further comprising a connector bank having power and data connectors configured to power and communicate with the at least two replaceable sub-devices.

10. The remote device in accordance with claim 1, further comprising an interface plate having electrical connectors configured to electrically interface with a junction box and the at least two replaceable sub-devices.

11. The remote device in accordance with claim 10, wherein the interface plate further comprises a set of connectors configured to physically attach the interface plate to the housing.

12. The remote device in accordance with claim 11, wherein the translation processor is comprised in an element selected from the group consisting of the remote device and the interface plate.

13. The remote device in accordance with claim 1, wherein the remote device has a non-addressable printed circuit board (PCB), and wherein the translation processor is comprised in an addressable PCB configured to be insertable into a receptacle of the remote device to communicate with the non-addressable PCB of the remote device.

14. The remote device in accordance with claim 1, further comprising:
- a first device protocol portion connected to the translation processor and configured to provide the communications between the translation processor and a fire alarm control panel (FACP) using the first device protocol; and
- a second device protocol portion connected to the translation processor and configured to provide the communications between the translation processor and the FACP using the second device protocol.

15. The remote device in accordance with claim 14, wherein the remote device has a non-addressable printed circuit board (PCB), wherein the translation processor is comprised in an addressable PCB configured to be insertable into a receptacle of the remote device to communicate with the non-addressable PCB of the remote device.

16. The remote device in accordance with claim 14, further comprising an interface plate having electrical connectors configured to electrically interface with a junction box and the at least two replaceable sub-devices, and wherein the translation processor, the first device protocol portion, and the second device protocol portion are comprised in an element selected from the group consisting of the remote device and the interface plate.

17. A method for providing a remote device for a fire alarm control system, the method comprising:

configuring each of at least two replaceable sub-devices to provide at least one of a notification and a detection of a fire event;

configuring a housing comprising a single enclosure to receive and connect to the at least two replaceable sub-devices within the housing; and a translation processor configured to selectively translate communications from the at least two replaceable sub-devices into at least one of at least two different device protocols including a first device protocol and a second device protocol.

18. The method in accordance with claim 17, further comprising at least two of:

configuring the housing to selectively attach or detach at least one speaker as at least one of the at least two replaceable sub-devices;

configuring the housing to selectively attach or detach at least one strobe as at least another one of the at least two replaceable sub-devices; and configuring the housing to selectively attach or detach at least one smoke detector as at least yet another one of the at least two replaceable sub-devices.

19. The method in accordance with claim 17, configuring the housing to receive a cover plate for covering a replaceable sub-device receiving aperture.

20. The method in accordance with claim 17, further comprising configuring mating connectors of the housing and each of the at least two replaceable devices to maintain a position of each of the at least two replaceable sub-devices within the housing.

21. The method in accordance with claim 17, further comprising configuring at least two of the at least two replaceable sub-devices to have a same device protocol.

22. The method in accordance with claim 21, further comprising:

configuring the remote device to include separate power and data interfaces; and configuring the separate power and data interfaces to support the same device protocol for each of the at least two replaceable sub-devices.

23. The method in accordance with claim 17, further comprising configuring at least two of the at least two replaceable sub-devices to have different device protocols.

24. The method in accordance with claim 23, further comprising:

configuring the remote device to include separate power and data interfaces; and configuring a respective one of the separate power and data interfaces to support each of the different device protocols.

25. The method in accordance with claim 17, further comprising configuring a connector bank having power and data connectors to power and communicate with the at least two replaceable sub-devices.

26. The method in accordance with claim 17, further comprising configuring an interface plate having electrical connectors to electrically interface with a junction box and the at least two replaceable sub-devices.

27. The method in accordance with claim 26, further comprising:

configuring the interface plate to include a set of connectors; and configuring the set of connectors to physically attach the interface plate to the housing.

28. The method in accordance with claim 26, further comprising configuring the translation processor to be included in an element selected from the group consisting of the remote device and the interface plate.

29. The method in accordance with claim 17, further comprising:

configuring the remote device to include a non-addressable printed circuit board (PCB);

configuring the translation processor to be included in an addressable PCB; and configuring the addressable PCB to be insertable into a receptacle of the remote device to communicate with the non-addressable PCB of the remote device.

30. The method in accordance with claim 17, further comprising:

configuring a first device protocol portion to be connected to the translation processor and provide the communications between the translation processor and a fire alarm control panel (FACP) using the first device protocol; and configuring a second device protocol portion to be connected to the translation processor and provide the communications between the translation processor and the FACP using the second device protocol.

31. The method in accordance with claim 30, further comprising:

configuring the remote device to have a non-addressable printed circuit board (PCB);

configuring the translation processor to be included in an addressable PCB; and configuring the addressable PCB to be insertable into a receptacle of the remote device to communicate with the non-addressable PCB of the remote device.

32. The method in accordance with claim 30, further comprising configuring an interface plate having electrical connectors to electrically interface with a junction box and the at least two replaceable sub-devices and, configuring the translation processor, the first device protocol portion, and the second device protocol portion to be included in an element selected from the group consisting of the remote device and the interface plate.

* * * * *